United States Patent
Zhu

(10) Patent No.: US 12,021,629 B2
(45) Date of Patent: Jun. 25, 2024

(54) HYBRID AUTOMATIC REPEAT REQUEST FEEDBACK METHOD AND DEVICE

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 547 days.

(21) Appl. No.: 17/288,836

(22) PCT Filed: Oct. 25, 2018

(86) PCT No.: PCT/CN2018/111965
§ 371 (c)(1),
(2) Date: Apr. 26, 2021

(87) PCT Pub. No.: WO2020/082307
PCT Pub. Date: Apr. 30, 2020

(65) Prior Publication Data
US 2021/0409159 A1    Dec. 30, 2021

(51) Int. Cl.
*H04L 1/16* (2023.01)
*H04L 1/1607* (2023.01)
(Continued)

(52) U.S. Cl.
CPC .......... *H04L 1/1671* (2013.01); *H04L 5/0092* (2013.01); *H04W 72/0453* (2013.01); *H04W 72/1273* (2013.01); *H04W 72/23* (2023.01)

(58) Field of Classification Search
CPC ........... H04L 1/12; H04L 1/16; H04L 1/1607; H04L 1/1671; H04L 5/00; H04L 5/0091;
(Continued)

(56) References Cited

U.S. PATENT DOCUMENTS

| 2006/0146856 A1* | 7/2006 | Jung | H04L 5/0046 370/431 |
|---|---|---|---|
| 2014/0269629 A1 | 9/2014 | Yang et al. | |
| 2019/0159251 A1* | 5/2019 | Li | H04L 1/18 |
| 2020/0100215 A1* | 3/2020 | Li | H04W 74/002 |
| 2020/0344728 A1* | 10/2020 | Gao | H04L 1/1812 |
| 2021/0212086 A1* | 7/2021 | Li | H04W 72/569 |

FOREIGN PATENT DOCUMENTS

| CN | 101651890 A | 2/2010 |
|---|---|---|
| CN | 102237992 A | 11/2011 |

(Continued)

OTHER PUBLICATIONS

International Search Report issued in PCT Application No. PCT/CN2018/111965 dated Jun. 27, 2019 with English translation, (4p).
Huawei, HiSilicon, "HARQ enhancements in NR unlicensed", 3GPP TSG RAN WG1 Meeting #94, Gothenburg, Sweden, R1-1808063, Aug. 20-24, 2018, (8p).
(Continued)

*Primary Examiner* — Warner Wong
(74) *Attorney, Agent, or Firm* — Arch & Lake LLP

(57) ABSTRACT

The present disclosure provides a hybrid automatic repeat request (HARQ) feedback method and apparatus. The method includes: configuring target indication information for a terminal, wherein the target indication information is used to indicate frequency domain resource identification information corresponding to at least one first candidate frequency domain resources; sending the target indication information to the terminal; after a physical downlink shared channel (PDSCH) is sent to the terminal, receiving an HARQ result for the PDSCH fed back by the terminal through the target frequency domain resource; wherein the target frequency domain resource is a frequency domain resource for carrying the HARQ result determined by the (Continued)

terminal from a preset frequency domain resource and at least one first candidate frequency domain resources.

14 Claims, 20 Drawing Sheets

(51) Int. Cl.
*H04L 5/00* (2006.01)
*H04W 72/0453* (2023.01)
*H04W 72/1273* (2023.01)
*H04W 72/23* (2023.01)

(58) Field of Classification Search
CPC .............. H04L 5/0092; H04L 1/0072; H04L 1/1812; H04L 2012/6497; H04L 2012/5631; H04L 2012/6456; H04L 5/003; H04L 5/0053; H04L 12/5692; H04L 12/40065; H04L 47/70; H04L 47/781; H04L 72/04; H04L 72/50; H04W 72/00; H04W 72/04; H04W 72/044; H04W 72/0453; H04W 72/12; H04W 72/1263; H04W 72/1273; H04W 72/1289; H04W 72/20
See application file for complete search history.

(56) References Cited

FOREIGN PATENT DOCUMENTS

| CN | 103095433 A | 5/2013 | |
|---|---|---|---|
| CN | 105050189 A | 11/2015 | |
| CN | 107295663 A | 10/2017 | |
| CN | 108633097 A | 10/2018 | |
| WO | WO-2017125077 A1 * | 7/2017 | ............ H04W 74/08 |
| WO | 2018164553 A2 | 9/2018 | |

OTHER PUBLICATIONS

Xiaomi, "Discussion on the HARQ enhancement for NR-U",3GPP TSG RAN WG1 Meeting #94bis, Chengdu, China, R1-1811417, Oct. 8-12, 2018, (4p).

Intel Corporation, "Enhancements to HARQ for NR-unlicensed ", 3GPP TSG RAN WG1 Meeting #94bis, Chengdu, China, R1-1810768, Oct. 8-12, 2018, (4p).

* cited by examiner

HYBRID AUTOMATIC REPEAT REQUEST FEEDBACK METHOD AND DEVICE

CROSS-REFERENCE OF RELATED APPLICATIONS

This application is a national phase application of International Application No. PCT/CN2018/111965, filed Oct. 25, 2018, the content of which is incorporated herein in its entirety by reference for all purposes.

TECHNICAL FIELD

The present disclosure relates to the field of communication technology, and in particular to hybrid automatic repeat request (HARQ) feedback methods and apparatuses.

BACKGROUND

In a long term evolution (LTE) system, a time delay exists between data transmission and feedback of an HARQ result.

A new mechanism is introduced in 5G new radio (NR). When a terminal performs HARQ feedback for a physical downlink shared channel (PDSCH) sent by a base station, the base station can first add indication information to downlink scheduling signaling, where the indication information is used to indicate that the terminal carries resource information on the HARQ result.

However, on an unlicensed spectrum, terminals need to contend for the use of channels. If the base station instructs a terminal to feed back an HARQ result in a certain bandwidth part (BWP), but the terminal does not successfully contend for a current channel, the terminal cannot feed back the HARQ result through the BWP instructed by the base station.

Accordingly, a method of performing HARQ result feedback at a preset location or sending the indication information from the base station to indicate the resource information on the HARQ result to the terminal may not be suitable for a communication system working in the unlicensed spectrum.

SUMMARY

To solve the problems of the related art, examples of the present disclosure provide a hybrid automatic repeat request (HARQ) feedback method and a hybrid automatic repeat request (HARQ) feedback apparatus.

According to a first aspect of the examples of the present disclosure, a hybrid automatic repeat request (HARQ) feedback method is provided. The method is applied in a base station and includes:

configuring target indication information for a terminal, where the target indication information is used to indicate frequency domain resource identification information corresponding to at least one first candidate frequency domain resources;

sending the target indication information to the terminal;

after a physical downlink shared channel (PDSCH) is sent to the terminal, receiving an HARQ result for the PDSCH fed back by the terminal through the target frequency domain resource;

wherein the target frequency domain resource is a frequency domain resource for carrying the HARQ result determined by the terminal from a preset frequency domain resource and at least one first candidate frequency domain resources.

Optionally, sending the target indication information to the terminal includes:

sending the target indication information to the terminal;

Optionally, if the number of the first candidate frequency domain resources is a plurality, the target indication information includes the plurality of pieces of indication information for indicating frequency domain resource identification information respectively corresponding to the plurality of first candidate frequency domain resources, and information contents of each piece of the indication information is carried by a preset information field in the scheduling signaling.

Optionally, if the number of the first candidate frequency domain resources is a plurality, information contents of the target indication information is carried by a preset information field in the scheduling signaling.

Optionally, the method further includes:

configuring target association information associated with the target indication information for the terminal, wherein the target association information comprises at least one of target location information or target length information, the target location information is used to indicate starting position information about the target indication information in the scheduling signaling, and the target length information is used to indicate a corresponding length value of the target indication information in the scheduling signaling; and sending the target association information to the terminal through preset signaling.

According to a second aspect of the examples of the present disclosure, a hybrid automatic repeat request (HARQ) feedback method is provided. The method is applied in a terminal and includes:

obtaining target indication information configured by a base station for a terminal, wherein the target indication information is used to indicate frequency domain resource identification information corresponding to at least one first candidate frequency domain resources;

after a physical downlink shared channel (PDSCH) sent by the base station is received, determining a target frequency domain resource from a preset frequency domain resource and at least one first candidate frequency domain resources;

feeding back an HARQ result for the PDSCH to the base station through the target frequency domain resource.

Optionally, obtaining target indication information configured by a base station for a terminal includes:

receiving scheduling signaling carrying the target indication information sent by the base station;

determining target association information associated with the target indication information; wherein the target association information comprises at least one of target location information and target length information, and the target location information is used to indicate starting position information of the target indication information in the scheduling signaling, and the target length information is used to indicate a corresponding length value of the target indication information in the scheduling signaling;

obtaining the target indication information from the scheduling signaling according to the target association information.

Optionally, determining target association information associated with the target indication information includes obtaining preset target association information associated with the target indication information; or receiving the target association information sent by the base station through preset signaling.

Optionally, determining a target frequency domain resource from a preset frequency domain resource and at least one first candidate frequency domain resources includes:

performing listen before talk (LBT) before data being transmitted on the preset frequency domain resource;

in response to that an LBT result for the preset frequency domain resource indicates a success, using the preset frequency domain resource as the target frequency domain resource;

in response to that the LBT result for the preset frequency domain resource indicates a failure, performing LBT on all the first candidate frequency domain resources, and determining at least one second candidate frequency domain resource, wherein each of the at least one second candidate frequency domain resource is a first candidate frequency domain resource whose LBT result is successful; and determining the target frequency domain resource from the at least one second candidate frequency domain resource.

Optionally, determining the target frequency domain resource from the at least one second candidate frequency domain resource includes:

in response to that a number of the second candidate frequency domain resources is one, determining the one second frequency domain resource as the target frequency domain resource;

in response to that the number of the second candidate frequency domain resources is a plurality, selecting one or more second candidate frequency domain resources from the plurality of second candidate frequency domain resources as the target frequency domain resource according to a preset resource selection rule; or using all of the at least one second candidate frequency domain resources as the target frequency domain resources.

According to a third aspect of the examples of the present disclosure, a hybrid automatic repeat request (HARQ) feedback method is provided. The method is applied in a base station and includes:

configuring a target correspondence for the terminal, wherein the target correspondence comprises a correspondence between different pieces of frequency domain resource identification information, and each piece of frequency domain resource identification information corresponds to a frequency domain resource;

sending the target correspondence to the terminal;

after a physical downlink shared channel (PDSCH) is sent to the terminal, receiving an HARQ result for the PDSCH fed back by the terminal through the target frequency domain resource;

wherein the target frequency domain resource is a frequency domain resource for carrying the HARQ result determined from a preset frequency domain resource and at least one third candidate frequency domain resource by the terminal, after the terminal determines at least one third candidate frequency domain resource corresponding to a preset frequency domain resource based on the target correspondence.

Optionally, sending the target correspondence to the terminal includes:

sending the target correspondence to the terminal through preset signaling.

According to a fourth aspect of the examples of the present disclosure, a hybrid automatic repeat request (HARQ) feedback method is provided. The method is applied in a terminal and includes:

receiving a target correspondence configured by a base station for a terminal, where the target correspondence includes a correspondence between different pieces of frequency domain resource identification information, and each piece of frequency domain resource identification information corresponds to a frequency domain resource.

after a physical downlink shared channel (PDSCH) sent by the base station is received, determining at least one third candidate frequency domain resource corresponding to a preset frequency domain resource according to the target correspondence; and determining the target frequency domain resource from the preset frequency domain resource and the at least one third candidate frequency domain resource;

feeding back an HARQ result for the PDSCH to the base station through the target frequency domain resource.

Optionally, determining the target frequency domain resource from the preset frequency domain resource and the at least one third candidate frequency domain resource includes performing listen before talk (LBT) before data being transmitted on the preset frequency domain resource;

in response to that a LBT result of the preset frequency domain resource indicates a success, using the preset frequency domain resource as the target frequency domain resource.

in response to that the LBT result of the preset frequency domain resource indicates a failure, performing LBT on all the third candidate frequency domain resources, and determining at least one fourth candidate frequency domain resource, wherein each of the at least one fourth candidate frequency domain resources is a third candidate frequency domain resources whose LBT result is successful;

determining the target frequency domain resource from the at least one fourth candidate frequency domain resource.

Optionally, determining the target frequency domain resource from the at least one fourth candidate frequency domain resource includes:

in response to that a number of the fourth candidate frequency domain resources is one, determining the one fourth candidate frequency domain resource as the target frequency domain resource;

in response to that a number of the fourth candidate frequency domain resources is a plurality, selecting one or more fourth candidate frequency domain resources from the plurality of third candidate frequency domain resources as the target frequency domain resources according to a preset resource selection rule; or using all of the at least one fourth candidate frequency domain resource as the target frequency domain resources.

According to a fifth aspect of the examples of the present disclosure, a hybrid automatic repeat request (HARQ) feedback method is provided. The method is applied in a base station and includes:

sending a physical downlink shared channel (PDSCH) to a terminal;

receiving an HARQ result for the PDSCH fed back by the terminal through the target frequency domain resource;

wherein the target frequency domain resource is a frequency domain resource for carrying the HARQ result determined, after the terminal determines at least one fifth candidate frequency domain resource corresponding to the preset frequency domain resource according to the preset target correspondence, from the preset frequency domain resource and the at least one fifth frequency domain resource; where the correspondence includes correspondences between frequency domain resources corresponding to different frequency domain resources.

According to a sixth aspect of the examples of the present disclosure, a hybrid automatic repeat request (HARQ) feedback method is provided. The method is applied in a terminal and includes:

after a physical downlink shared channel (PDSCH) sent by a base station is received, determining at least one fifth candidate frequency domain resource corresponding to a preset frequency domain resource according to the preset target correspondence; wherein the target correspondence comprises a correspondence between different pieces of frequency domain resource identification information, and each piece of frequency domain resource identification information corresponds to a frequency domain resource;

determining a target frequency domain resource from the preset frequency domain resource and the at least one fifth candidate frequency domain resource.

feeding back an HARQ result for the PDSCH to the base station through the target frequency domain resource.

Optionally, determining a target frequency domain resource from the preset frequency domain resource and the at least one fifth candidate frequency domain resource includes:

performing listen before talk (LBT) before data being transmitted on the preset frequency domain resource;

in response to that a LBT result of the preset frequency domain resource indicates a success, using the preset frequency domain resource as the target frequency domain resource;

in response to that the LBT result of the preset frequency domain resource indicates a failure, performing LBT on all the fifth candidate frequency domain resources, and determining at least one sixth candidate frequency domain resource, wherein each of the at least one sixth candidate frequency domain resources is a fifth candidate frequency domain resources whose LBT result is successful;

determining the target frequency domain resource from the at least one sixth candidate frequency domain resource.

Optionally, determining the target frequency domain resource from the sixth candidate frequency domain resources includes:

in response to that a number of the sixth candidate frequency domain resources is one, determining the sixth candidate frequency domain resource as the target frequency domain resource;

in response to that a number of the sixth candidate frequency domain resources is a plurality, selecting one or more of the sixth candidate frequency domain resources as the target frequency domain resources according to a preset resource selection rule; or using all of the at least one sixth candidate frequency domain resource as the target frequency domain resources.

According to a seventh aspect of the examples of the present disclosure, a hybrid automatic repeat request (HARQ) feedback method is provided. The method is applied in a base station and includes:

a first configuration module, configured to configure target indication information for a terminal; wherein the target indication information is used to indicate frequency domain resource identification information corresponding to at least one first candidate frequency domain resources;

a first sending module, configured to send the target indication information to the terminal;

a first receiving module, configured to, after a physical downlink shared channel (PDSCH) is sent to the terminal, receive an HARQ result for the PDSCH fed back by the terminal through a target frequency domain resource;

wherein the target frequency domain resource is a frequency domain resource for carrying the HARQ result determined by the terminal from a preset frequency domain resource and at least one first candidate frequency domain resources.

Optionally, the first sending module includes:

a first sending module, configured to send the target indication information to the terminal through scheduling signaling;

Optionally, in response to that a number of the first candidate frequency domain resources is a plurality, the target indication information comprises the plurality of pieces of indication information for indicating frequency domain resource identification information respectively corresponding to the plurality of first candidate frequency domain resources, and information contents of each piece of the indication information is carried by a preset information field in the scheduling signaling.

Optionally, in response to that a number of the first candidate frequency domain resources is a plurality, information contents of the target indication information is carried by a preset information field in the scheduling signaling.

In an example, the apparatus further includes:

a second configuration module, configured to configure target association information associated with the target indication information for the terminal, wherein the target association information comprises at least one of target location information or target length information, the target location information is used to indicate starting position information about the target indication information in the scheduling signaling, and the target length information is used to indicate a corresponding length value of the target indication information in the scheduling signaling; and a second sending module, configured to send the target association information to the terminal through preset signaling;

According to a eighth aspect of the examples of the present disclosure, a hybrid automatic repeat request (HARQ) feedback apparatus is provided. The apparatus is applied in a terminal and includes:

an obtaining module, configured to obtain target indication information configured by a base station for a terminal; wherein the target indication information is used to indicate frequency domain resource identification information corresponding to at least one first candidate frequency domain resources;

a first determining module, configured to, after a PDSCH sent by the base station is received, determine a target frequency domain resource from a preset frequency domain resource and the at least one first candidate frequency domain resources;
a third sending module, configured to, feed back an HARQ result for the PDSCH to the base station.

Optionally, the obtaining module includes:

a receiving sub-module, configured to receive scheduling information carrying the target indication information sent by the base station;
a first determining sub-module, configured to determine target association information associated with the target indication information; the target association information includes at least one of target location information and target length information, and the target location information is used to indicate starting position information about the target indication information in the scheduling signaling, and the target length information is used to indicate a corresponding length value of the target indication information in the scheduling signaling;
an obtaining sub-module, configured to obtain the target indication information from the scheduling signaling according to the target association information.

Optionally, the first determining sub-module includes:

an obtaining unit, configured to obtain preset target association information associated with the target indication information; or
a receiving unit, configured to receive the target association information sent by the base station through preset signaling.

Optionally, the first determining module includes:

a first execution sub-module, configured to perform listen before talk (LBT) before data being transmitted on the preset frequency domain resource;
a second determining sub-module, configured to, in response to that a LBT result of the preset frequency domain resource indicates a success, use the preset frequency domain resource as the target frequency domain resource;
a third determining sub-module, configured to, in response to that the LBT result for the preset frequency domain resource indicates a failure, perform LBT on all the first candidate frequency domain resources, and determine at least one second candidate frequency domain resource, wherein each of the at least one second candidate frequency domain resource is a first candidate frequency domain resource whose LBT result is successful; and
a fourth determining sub-module, configured to determine the target frequency domain resource from the at least one second candidate frequency domain resource.

Optionally, the fourth determining sub-module includes:

a first determining unit, configured to, in response to that a number of the second candidate frequency domain resources is one, determine the one second frequency domain resource as the target frequency domain resource;
a first selection unit, configured to, in response to that a number of the second candidate frequency domain resources is a plurality, select one or more of the second candidate frequency domain resources from the plurality of second candidate frequency domain resources as the target frequency domain resources according to a preset resource selection rule; or a second determining unit, configured to use all of the at least one second candidate frequency domain resources as the target frequency domain resources.

According to a ninth aspect of the examples of the present disclosure, a hybrid automatic repeat request (HARQ) feedback apparatus is provided. The apparatus is applied in a base station and includes:

a third configuration module, configured to configure a target correspondence for a terminal, where the target correspondence comprises a correspondence between different pieces of frequency domain resource identification information, and each piece of frequency domain resource identification information corresponds to a frequency domain resource;
a fourth sending module, configured to send the target correspondence to the terminal;
a second receiving module, configured to, after a physical downlink shared channel (PDSCH) is sent to the terminal, receive an HARQ result for the PDSCH fed back by the terminal through a target frequency domain resource;
wherein the target frequency domain resource is a frequency domain resource for carrying the HARQ result determined from a preset frequency domain resource and at least one third candidate frequency domain resource by the terminal, after the terminal determines at least one third candidate frequency domain resource corresponding to a preset frequency domain resource based on the target correspondence.

Optionally, the fourth sending module includes:

a second sending sub-module, configured to send the target correspondence to the terminal through preset signaling.

According to a tenth aspect of the examples of the present disclosure, a hybrid automatic repeat request (HARQ) feedback apparatus is provided. The apparatus is applied in a terminal and includes:

a third receiving module, configured to receive a target correspondence configured by a base station for the terminal, wherein the target correspondence comprises a correspondence between different pieces of frequency domain resource identification information, and each piece of frequency domain resource identification information corresponds to a frequency domain resource;
a second determining module, configured to, after a physical downlink shared channel (PDSCH) sent by the base station is received, determine at least one third candidate frequency domain resource corresponding to a preset frequency domain resource according to the target correspondence;
a fifth sending module, configured to, feed back an HARQ result for the PDSCH to the base station through the target frequency domain resource.

Optionally, the second determining module includes:

a second execution sub-module, configured to perform listen before talk (LBT) before data being transmitted on the preset frequency domain resource;
a fifth determining sub-module, configured to, in response to that a LBT result of the preset frequency domain resource indicates a success, use the preset frequency domain resource as the target frequency domain resource;
a sixth determining sub-module, configured to, in response to that the LBT result of the preset frequency domain resource indicates a failure, perform LBT on all the third candidate frequency domain resources, and determine at least one fourth candidate frequency domain resource, wherein each of the at least one fourth candidate frequency domain resources is a third candidate frequency domain resources whose LBT result is successful;

a seventh determining sub-module, configured to determine the target frequency domain resource from the at least one fourth candidate frequency domain resource.

Optionally, the seventh sub-module includes:

a third determining unit, configured to, in response to that a number of the fourth candidate frequency domain resources is one, determine the one fourth candidate frequency domain resource as the target frequency domain resource;

a second selection unit, configured to in response to that a number of the fourth candidate frequency domain resources is a plurality, select one or more fourth candidate frequency domain resources from the plurality of third candidate frequency domain resources as the target frequency domain resources according to a preset resource selection rule; or a fourth determining unit, configured to use all of the at least one fourth candidate frequency domain resource as the target frequency domain resources.

According to an eleventh aspect of the examples of the present disclosure, a hybrid automatic repeat request (HARQ) feedback apparatus is provided. The apparatus is applied in a base station and includes:

a sixth sending module, configured to send a physical downlink shared channel (PDSCH) to a terminal;

a fourth receiving module, configured to receive an HARQ result for the PDSCH fed back by the terminal through the target frequency domain resource;

The target frequency domain resource is a frequency domain resource for carrying the HARQ result determined, after the terminal determines at least one fifth candidate frequency domain resource corresponding to the preset frequency domain resource according to the preset target correspondence, from the preset frequency domain resource and the at least one fifth frequency domain resource; where the correspondence includes correspondences between frequency domain resources corresponding to different frequency domain resources.

According to a twelfth aspect of the examples of the present disclosure, a hybrid automatic repeat request (HARQ) feedback apparatus is provided. The apparatus is applied in a terminal and includes:

a third determining module, configured to, after a physical downlink shared channel (PDSCH) sent by the base station is received, determine at least one fifth candidate frequency domain resource corresponding to the preset frequency domain resource according to the preset target correspondence; the target correspondence includes a correspondence between different pieces of frequency domain resource identification information, and each piece of frequency domain resource identification information corresponds to a frequency domain resource;

a fourth determining module, configured to determine a target frequency resource from the preset frequency domain resource and the at least one fifth candidate frequency domain resource;

a seventh sending module, configured to, feed back an HARQ result for the PDSCH to the base station through the target frequency domain resource.

Optionally, the fourth determining module includes:

a third execution sub-module, configured to perform listen before talk (LBT) before data being transmitted on the preset frequency domain resource;

an eighth determining sub-module, configured to, in response to that a LBT result of the preset frequency domain resource indicates a success, use the preset frequency domain resource as the target frequency domain resource;

a ninth determining sub-module, configured to, in response to that the LBT result of the preset frequency domain resource indicates a failure, perform LBT on all the fifth candidate frequency domain resources, and determine at least one sixth candidate frequency domain resource, wherein each of the at least one sixth candidate frequency domain resource is a fifth candidate frequency domain resources whose LBT result is successful;

a tenth determining sub-module, configured to determine the target frequency domain resource from the at least one sixth candidate frequency domain resource.

Optionally, the tenth determining sub-module includes:

a fifth determining unit, configured to, in response to that a number of the sixth candidate frequency domain resources is one, determine the sixth candidate frequency domain resource as the target frequency domain resource;

a third selection unit, configured to, in response to that a number of the sixth candidate frequency domain resources is a plurality, select one or more of the sixth candidate frequency domain resources as the target frequency domain resources according to a preset resource selection rule; or a sixth determining unit, configured to use all of the at least one sixth candidate frequency domain resource as the target frequency domain resources.

According to a thirteenth aspect of the examples of the present disclosure, there is provided a non-transitory computer readable storage medium storing computer programs, where the computer program is configured to implement any of the HARQ feedback methods as described in the first aspect.

According to a fourteenth aspect of the examples of the present disclosure, there is provided a non-transitory computer readable storage medium storing computer programs, where the computer program is configured to implement any of the HARQ feedback methods as described in the second aspect.

According to a fifteenth aspect of the examples of the present disclosure, there is provided a non-transitory computer readable storage medium storing computer programs, where the computer program is configured to implement any of the HARQ feedback methods as described in the third aspect.

According to a sixteenth aspect of the examples of the present disclosure, there is provided a non-transitory computer readable storage medium storing computer programs, where the computer program is configured to implement any of the HARQ feedback methods as described in the fourth aspect.

According to a seventeenth aspect of the examples of the present disclosure, there is provided a non-transitory computer readable storage medium storing computer programs, where the computer program is configured to implement any of the HARQ feedback methods as described in the fifth aspect.

According to an eighteenth aspect of the examples of the present disclosure, there is provided a non-transitory computer readable storage medium storing computer programs, where the computer program is configured to implement any of the HARQ feedback methods as described in the sixth aspect.

According to a nineteenth aspect of the examples of the present disclosure, a hybrid automatic repeat request (HARQ) feedback apparatus is provided. The apparatus is applied in a base station and includes:
- a processor; and
- a memory for storing instructions executed by the processor,
- wherein the processor is configured to:
- configure target indication information for a terminal, where the target indication information is used to indicate frequency domain resource identification information corresponding to at least one first candidate frequency domain resources;
- send the target indication information to the terminal;
- after a physical downlink shared channel (PDSCH) is sent to the terminal, receive an HARQ result for the PDSCH fed back by the terminal through the target frequency domain resource;
- wherein the target frequency domain resource is a frequency domain resource for carrying the HARQ result determined by the terminal from a preset frequency domain resource and at least one first candidate frequency domain resources.

According to a twentieth aspect of the examples of the present disclosure, a hybrid automatic repeat request (HARQ) feedback apparatus is provided. The apparatus is applied in a terminal and includes:
- a processor; and
- a memory for storing instructions executed by the processor,
- wherein the processor is configured to:
- obtain target indication information configured by a base station for a terminal, wherein the target indication information is used to indicate frequency domain resource identification information corresponding to at least one first candidate frequency domain resources;
- after a physical downlink shared channel (PDSCH) sent by the base station is received, determine a target frequency domain resource from a preset frequency domain resource and at least one first candidate frequency domain resources;
- feed back an HARQ result for the PDSCH to the base station through the target frequency domain resource.

According to a twenty first aspect of the examples of the present disclosure, a hybrid automatic repeat request (HARQ) feedback apparatus is provided. The apparatus is applied in a base station and includes:
- a processor; and
- a memory for storing instructions executed by the processor,
- wherein the processor is configured to:
- configure a target correspondence for the terminal, wherein the target correspondence comprises correspondences between frequency domain resource identification information corresponding to different frequency domain resources;
- send the target correspondence to the terminal;
- after a physical downlink shared channel (PDSCH) is sent to the terminal, receive an HARQ result for the PDSCH fed back by the terminal through the target frequency domain resource;
- wherein the target frequency domain resource is a frequency domain resource for carrying the HARQ result determined from a preset frequency domain resource and at least one third candidate frequency domain resource by the terminal, after the terminal determines at least one third candidate frequency domain resource corresponding to a preset frequency domain resource based on the target correspondence.

According to a twenty second aspect of the examples of the present disclosure, a hybrid automatic repeat request (HARQ) feedback apparatus is provided. The apparatus is applied in a terminal and includes:
- a processor; and
- a memory for storing instructions executed by the processor,
- wherein the processor is configured to:
- receive a target correspondence configured by a base station for a terminal, where the target correspondence includes a correspondence between different pieces of frequency domain resource identification information, and each piece of frequency domain resource identification information corresponds to a frequency domain resource.
- after a physical downlink shared channel (PDSCH) sent by the base station is received, determine at least one third candidate frequency domain resource corresponding to a preset frequency domain resource according to the target correspondence; and determine the target frequency domain resource from the preset frequency domain resource and the at least one third candidate frequency domain resource;
- feed back an HARQ result for the PDSCH to the base station through the target frequency domain resource.

According to a twenty third aspect of the examples of the present disclosure, a hybrid automatic repeat request (HARQ) feedback apparatus is provided. The apparatus is applied in a base station and includes:
- a processor; and
- a memory for storing instructions executed by the processor,
- wherein the processor is configured to:
- send a physical downlink shared channel (PDSCH) to a terminal;
- receive an HARQ result for the PDSCH fed back by the terminal through the target frequency domain resource;
- wherein the target frequency domain resource is a frequency domain resource for carrying the HARQ result determined, after the terminal determines at least one fifth candidate frequency domain resource corresponding to the preset frequency domain resource according to the preset target correspondence, from the preset frequency domain resource and the at least one fifth frequency domain resource; where the correspondence includes correspondences between frequency domain resources corresponding to different frequency domain resources.

According to a twenty fourth aspect of the examples of the present disclosure, a hybrid automatic repeat request (HARQ) feedback apparatus is provided. The apparatus is applied in a terminal and includes:
- a processor; and
- a memory for storing instructions executed by the processor,
- wherein the processor is configured to:
- after a physical downlink shared channel (PDSCH) sent by a base station is received, determine at least one fifth candidate frequency domain resource corresponding to a preset frequency domain resource according to the preset target correspondence; wherein the target correspondence comprises correspondences between frequency domain resource identification information corresponding to different frequency domain resources;

determine a target frequency domain resource from the preset frequency domain resource and the at least one fifth candidate frequency domain resource.

feed back an HARQ result for the PDSCH to the base station through the target frequency domain resource.

The technical solutions provided by the examples of the present disclosure may include the following beneficial effects.

In the above embodiment, in a communication system with an unlicensed spectrum, at the base station side, target indication information is configured for the terminal, where the target indication information is used to indicate frequency domain resource identification information corresponding to at least one first candidate frequency domain resources; so that the terminal side can determine a target frequency domain resource for performing the HARQ result feedback from a preset frequency domain resource and at least one first candidate frequency domain resources based on target indication information configured by the terminal side for the base station.

In the embodiments of the present disclosure, the base station side can send the target indication information to the terminal through scheduling signaling, which is simple to implement and has high availability.

In the embodiment of the present disclosure, if the number of the first candidate frequency domain resources is a plurality, the base station may carry different information content of the indication information through different preset information fields in the scheduling signaling, wherein the different indication information is used to indicate frequency domain resource identification information corresponding to the different first candidate frequency domain resources. Further, the base station may directly carry the information contents of the target indication information through a preset information field in the scheduling signaling. Through the above process, the purpose of indicating at least one first candidate frequency domain resources for the terminal through scheduling signaling is achieved.

In the above embodiment, the base station may also configure target association information associated with target indication information for the terminal, and send the target association information to the terminal through preset signaling. The target association information may include at least one of target location information and target length information. The terminal side can obtain the target indication information in the scheduling signaling according to the target association information.

In the embodiment of the present disclosure, the terminal may first obtain the target indication information configured by the base station for itself, and after receiving the physical downlink shared channel (PDSCH) sent by the base station, determine the target frequency domain resource from a preset frequency domain resource and at least one first candidate frequency domain resources, so that the HARQ result for the PDSCH can be fed back to the base station through the target frequency domain resource. It can be implemented that in a communication system with an unlicensed spectrum, based on target indication information configured by the base station, the terminal determines a target frequency domain resource for performing the HARQ result feedback from a preset frequency domain resource and at least one first candidate frequency domain resources.

In the embodiment of the present disclosure, the terminal may obtain the target indication information based on scheduling signaling carrying target indication information and target association information. Optionally, the target association information may be preset, or sent by the base station to the terminal through preset signaling. Through the above process, the terminal can quickly obtain the target indication information configured by the base station for itself, so as to determine the target frequency domain resource.

In the embodiment of the present disclosure, if a LBT result of the preset frequency domain resource indicates a success, the terminal may use the preset frequency domain resource as the target frequency domain resource, and feed back the HARQ result through the preset frequency domain resource. If the LBT result of the preset frequency domain resource indicates a failure, the target frequency domain resource for feeding back the HARQ result may be determined in a first candidate frequency domain resource whose LBT result is a success, that is, the second candidate frequency domain resource. Through the above process, the method for determining the target frequency domain resource on the terminal side is more reasonable and available.

In the embodiment of the present disclosure, when the terminal determines the target frequency domain resource in the second candidate frequency domain resource, if the number of the second candidate frequency domain resource is one, the terminal directly uses the one second candidate frequency domain resource as the target frequency domain resource. If the number of the second candidate frequency domain resources is a plurality, the terminal can select one or more of the second candidate frequency domain resources as target frequency domain resources according to a preset resource selection rule, or the terminal can use all the second candidate frequency domain resources as the target frequency domain resources, thereby improving the reliability of HARQ result feedback on the terminal side.

In the above embodiment, in the communication system of the unlicensed spectrum, a target correspondence is configured for the terminal on the base station side, so that the terminal side can determine a target frequency domain resource for performing HARQ result feedback based on the target correspondence from a preset frequency domain resources and at least one third candidate frequency domain resource corresponding to the preset frequency domain resource.

In the embodiment of the present disclosure, the base station may send the target correspondence to the terminal through preset signaling, which is simple to implement and has high availability.

In the embodiment of the present disclosure, the terminal side may determine the at least one third candidate frequency domain resource corresponding to the preset frequency domain resource based on the target correspondence configured by the base station, and then, determine a target frequency resource from the preset frequency domain resource and the at least one third candidate frequency domain resource, so as to feed back an HARQ result through the target frequency domain resource. In a communication system with an unlicensed spectrum, the purpose of determining the target frequency resource from a preset frequency domain resource and at least one third candidate frequency domain resource on the terminal side based on a target correspondence configured by a base station is realized.

In the embodiments of the present disclosure, the base station does not need to configure the target correspondence for the terminal. The target correspondence is preset, and the base station only needs to send the PDSCH to the terminal. In a communication system with an unlicensed spectrum, based on the preset target correspondence, the terminal can determine the target frequency domain resource from the preset frequency domain resource and at least one fifth candidate frequency domain resource corresponding to the preset frequency domain resource.

In the embodiments of the present disclosure, after receiving the PDSCH sent by the base station, the terminal can quickly determine at least one fifth candidate frequency domain resource corresponding to the preset frequency domain resource directly according to the preset target correspondence. In a communication system with an unlicensed spectrum, the purpose of determining the target frequency resource from a preset frequency domain resource and at least one fifth candidate frequency domain resource on the terminal side based on a preset target correspondence configured is realized.

It should be understood that the above general description and the following detailed description are only exemplary and explanatory and are not restrictive of the present disclosure.

BRIEF DESCRIPTION OF THE DRAWINGS

The drawings herein are incorporated into the specification and constitute a part of the specification, show embodiments in accordance with the present disclosure, and together with the specification are used to explain the principle of the present disclosure.

DETAILED DESCRIPTION OF THE EMBODIMENTS

Figure 1:
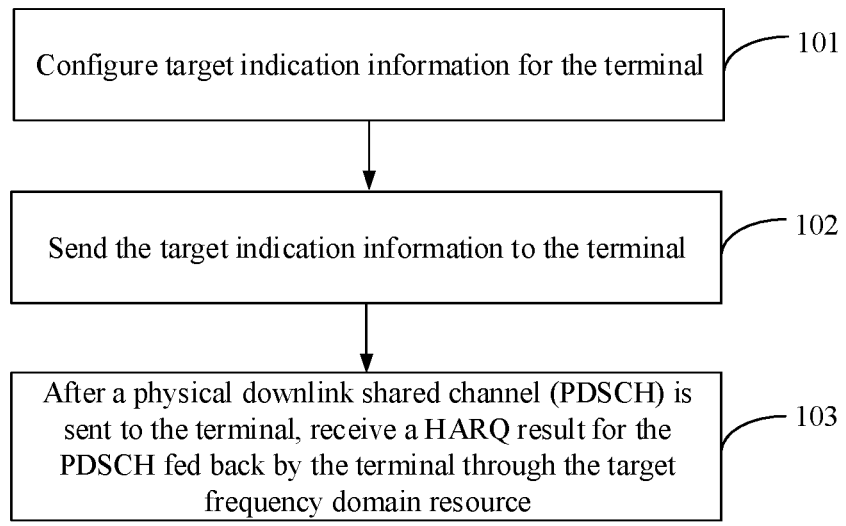
FIG. 1 is a flowchart illustrating an HARQ feedback method according to an example.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information; and similarly, second information may also be referred as first information. Depending on the context, the word "if" as used herein can be interpreted as "upon" or "when" or "in response to determination".

A first hybrid automatic repeat request (HARQ) feedback method provided by the embodiments of the present disclosure can be implemented in a communication system with an unlicensed spectrum, based on target indication information configured by a base station, a terminal side determines a target frequency domain resource for performing HARQ result feedback from a preset frequency domain resource and at least one first candidate frequency domain resource.

The following introduces the first HARQ feedback method provided by the embodiments of the present disclosure from a base station side.

The embodiments of the present disclosure provide an HARQ feedback method, which can be applied in a base station. FIG. 1 is a flowchart illustrating an HARQ feedback method according to an example, which includes the following steps.

At step 101, target indication information is configured for a terminal, where the target indication information is used to indicate frequency domain resource identification information corresponding to at least one first candidate frequency domain resource.

At step 102, the target indication information is sent to the terminal.

At step 103, after a physical downlink shared channel (PDSCH) is sent to the terminal, an HARQ result for the PDSCH fed back by the terminal is received through a target frequency domain resource.

The target frequency domain resource is a frequency domain resource determined by the terminal from a preset frequency domain resource and the candidate frequency domain resources for carrying the HARQ result.

In the above embodiment, in a communication system with an unlicensed spectrum, at the base station side, target indication information is configured for the terminal, where the target indication information is used to indicate frequency domain resource identification information corresponding to at least one first candidate frequency domain resource, so that the terminal side can determine a target frequency domain resource for performing the HARQ result feedback from a preset frequency domain resource and the at least one first candidate frequency domain resource based on the target indication information configured by the base station.

For step 101, the target indication information configured by the base station for the terminal may include frequency domain resource identification information corresponding to each of one or more first candidate frequency domain resources. Optionally, the frequency domain resource identification may be at least one of a carrier identification or a BWP identification.

For example, the target indication information may include respective corresponding frequency domain resource identification information such as BWP 1 carrier 1, BWP 1 in carrier 2, and BWP 3 in carrier 2.

For step 102, the base station may send the target indication information to the terminal through scheduling signaling.

The scheduling signaling is signaling that can schedule data bearing in a time domain unit. For example, when the scheduling signaling is downlink scheduling signaling, the terminal may schedule a time domain unit to receive data according to the signaling. The time domain unit may be an orthogonal frequency division multiplexing (OFDM) symbol, a slot, a sub-frame, or a radio frame.

Figure 2A:
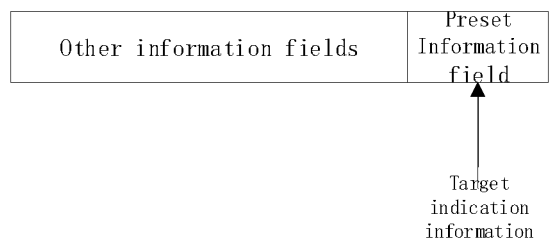
FIGS. 2A to 2C are schematic diagrams illustrating HARQ feedback scenarios according to an example.

In the embodiments of the present disclosure, if the number of the first candidate frequency domain resources is one, the base station may carry the target indication information at a preset information field in the scheduling signaling, for example, as shown in FIG. 2A.

Figure 2B:
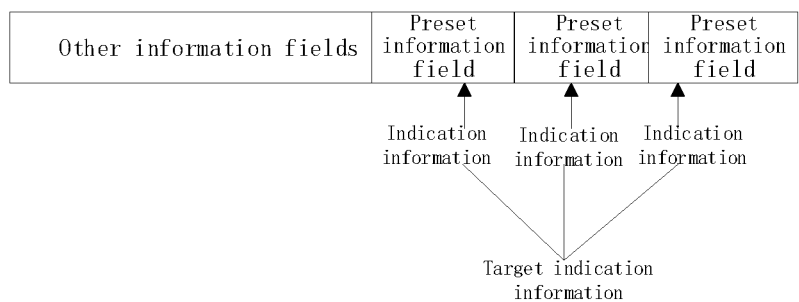

If the number of the first candidate frequency domain resources is a plurality, the target indication information may be divided into multiple pieces of indication information, and each piece of indication information is used to indicate frequency domain resource identification information corresponding to a first candidate frequency domain resource. Different preset information fields in the scheduling signaling are used to carry information contents of different identification information, for example, as shown in FIG. 2B.

Figure 2C:
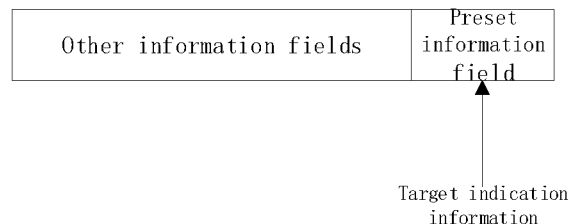

Alternatively, the number of the first candidate frequency domain resources is a plurality. and the base station may first jointly encode multiple pieces of frequency domain resource identification information corresponding to all the first candidate frequency domain resources, so that the target indication information may directly indicate the multiple pieces of frequency domain resource identification information corresponding to all the first candidate frequency domain resources. Further, the base station may carry information contents of the target indication information at a preset information field in the scheduling signaling, for example, as shown in FIG. 2C.

For step 103, the base station may send the PDSCH to the terminal according to the related art, and after the terminal determines the target frequency domain resource from the preset frequency domain resource and the at least one first candidate frequency domain resource based on the target indication information, the terminal feeds back an HARQ result for the PDSCH through the target frequency domain resource.

Figure 3:
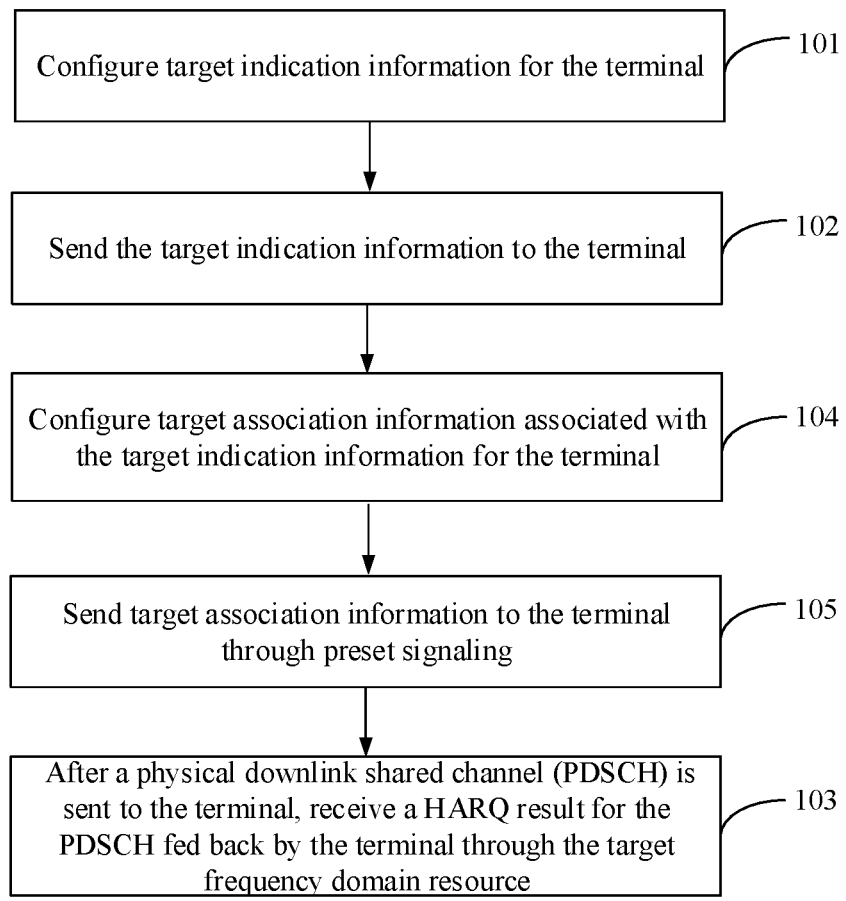
FIG. 3 is a flowchart illustrating another HARQ feedback method according to an example.

In an embodiment, FIG. 3 is a flowchart of another HARQ feedback method according to the embodiment shown in FIG. 1. The above method may further include the following steps.

At step 104, target association information associated with the target indication information is configured for the terminal. In this step, the target association information may include at least one of target location information or target length information.

For example, the base station configures for the terminal that a starting position of the target indication information in the scheduling signaling is located at the nth bit.

Further, if the terminal currently has 4 available BWPs, the target length information configured by the base station for the terminal may correspond to 2 bits. If the terminal currently has 8 available BWPs, the target length information configured by the base station for the terminal may correspond to 3 bits.

At step 105, target association information is sent to the terminal through preset signaling.

Optionally, the preset signaling may be radio resource control (RRC) signaling, media access control (MAC) signaling, or physical layer signaling, etc.

According to the target association information, the terminal side can directly read, in the scheduling signaling, information contents having a length corresponding to a length value indicated by the target length information from the starting position indicated by the target location information, thereby obtaining the target indication information.

In the above embodiment, the base station may configure target association information associated with target indication information for the terminal, and send the target association information to the terminal through preset signaling. The target association information may include at least one of target location information and target length information. The terminal side can obtain the target indication information in the scheduling signaling according to the target association information.

In the embodiments of the present disclosure, the target association information can also be preset in a communication protocol, so that the base station does not need to configure the terminal, and there is no need to send the target association information through preset signaling to the terminal. After the terminal receives the scheduling signaling, the terminal can directly obtain the target indication information in the scheduling signaling according to the target association information preset in the communication protocol.

The following introduces a first HARQ feedback method provided by the embodiments of the present disclosure from a terminal side.

Figure 4:
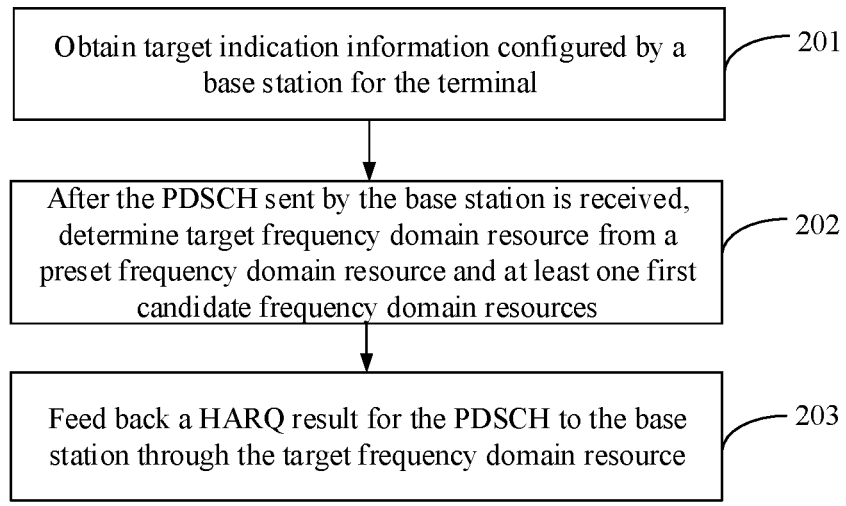
FIG. 4 is a flowchart illustrating another HARQ feedback method according to an example.

The embodiments of the present disclosure provide another HARQ feedback method which can be applied in a terminal. FIG. 4 is a flowchart illustrating another HARQ feedback method according to an example, including the following steps.

At step 201, target indication information configured by a base station for the terminal is obtained. The target indication information is used to indicate frequency domain resource identification information corresponding to at least one first candidate frequency domain resource.

At step 202, after a PDSCH sent by the base station is received, target frequency domain resource is determined from a preset frequency domain resource and the at least one first candidate frequency domain resource.

At step 203, an HARQ result for the PDSCH is fed back to the base station through the target frequency domain resource.

In the above embodiment, it can be implemented that in a communication system with an unlicensed spectrum, based on target indication information configured by the base station, the terminal determines a target frequency domain resource for performing the HARQ result feedback from a preset frequency domain resource and at least one first candidate frequency domain resource.

Figure 5:
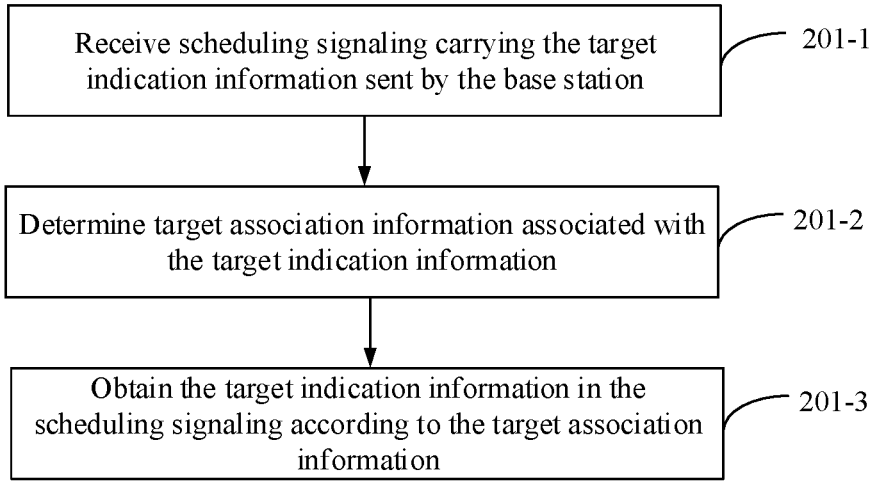
FIG. 5 is a flowchart illustrating another HARQ feedback method according to an example.

For step 201, as shown in FIG. 5, which is a flowchart illustrating another HARQ feedback method according to the embodiment shown in FIG. 4, step 201 may include the following steps.

At step 201-1, scheduling signaling carrying the target indication information sent by the base station is received.

At step 201-2, target association information associated with the target indication information is determined.

In this step, the terminal can directly obtain the target association information preset in a communication protocol, or the terminal may receive the target association information sent by the base station through preset signaling. The preset signaling may be RRC signaling, MAC signaling, physical layer signaling, etc.

At step 201-3, the target indication information is obtained in the scheduling signaling according to the target association information.

In this step, the terminal can directly read, in the scheduling signaling, information contents having a length corresponding to a length value indicated by target length information from a starting position indicated by target location information, thereby obtaining the target indication information.

Figure 6:
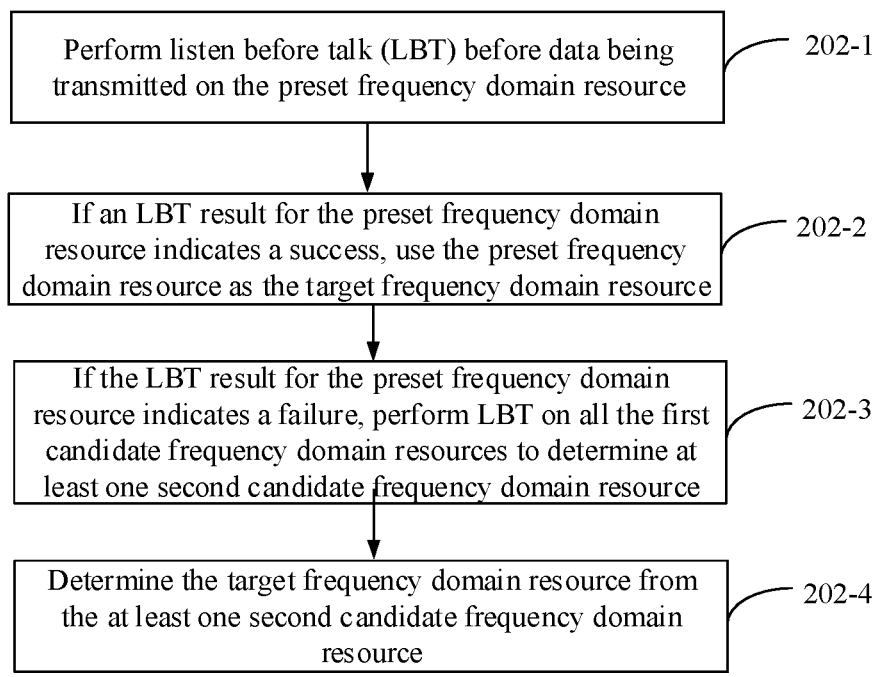
FIG. 6 is a flowchart illustrating another HARQ feedback method according to an example.

For step 202, as shown in FIG. 6, which is a flowchart illustrating another HARQ feedback method according to the embodiment shown in FIG. 4, step 202 may include the following steps.

At step 202-1, listen before talk (LBT) is performed on the preset frequency domain resource.

In the embodiments of the present disclosure, the preset frequency domain resource may be a frequency domain resource used for uplink data transmission corresponding to a frequency domain resource used by the terminal to receive the PDSCH sent by the base station, where the correspondence is informed to the terminal in advance by the base station.

For example, the frequency domain resource used by the base station to send the PDSCH to the terminal is BWP 1, and the terminal side may use a frequency domain resource BWP 2 corresponding to BWP 1, e.g., BWP 2, for uplink data transmission as the preset frequency domain resource. The correspondence between BWP 1 and BWP 2 is informed to the terminal in advance by the base station through preset signaling.

In this step, the terminal can first perform the LBT on the preset frequency domain resource according to related art.

At step 202-2, if an LBT result of the preset frequency domain resource indicates a success, the preset frequency domain resource is used as the target frequency domain resource.

In this step, if the LBT result of the preset frequency domain resource indicates a success, it means that the terminal successfully contends for a current channel. The HARQ result can be fed back through the preset frequency domain resource. Therefore, the terminal can directly use the preset frequency domain resource as the target frequency domain resource.

At step 202-3, if the LBT result of the preset frequency domain resource indicates a failure, LBT is performed on all the first candidate frequency domain resources to determine at least one second candidate frequency domain resource.

In this step, if the LBT result of the terminal on the preset frequency domain resource indicates a failure, it means that the terminal fails in contending for the current channel. At this time, the target frequency domain resource needs to be determined among the one or more first candidate frequency domain resources.

Further, the terminal may perform LBT on all the first candidate frequency domain resources, and use a first candidate frequency domain resource whose LBT result is successful as a second candidate frequency domain resource.

For example, the first candidate frequency resources include BWP 2, BWP 3, and BWP 4, and LBT is performed on all the first candidate frequency domain resources. If the LBT results of BWP 2 and BWP 4 are successful, BWP 2 and BWP 4 are the second candidate frequency domain resources.

At step 202-4, the target frequency domain resource is determined among the at least one second candidate frequency domain resource.

In this step, if the number of the second candidate frequency domain resource is one, the terminal may directly use this second candidate frequency domain resource as the target frequency domain resource.

For example, if the second candidate frequency domain resource is BWP 2, the terminal directly uses BWP 2 as the target frequency domain resource.

If the number of the second candidate frequency domain resources is a plurality, the terminal may select one or more second candidate resources from the plurality of second candidate frequency domain resources according to a preset resource selection rule as the target frequency domain resource.

In the embodiments of the present disclosure, the resource selection rule may be that one or more frequency domain resources are randomly selected by the terminal, or one or more frequency domain resources may be selected according to values corresponding to the frequency domain resource identification information in an ascending order, or one or more frequency domain resources may be selected according to bandwidth values in a descending order.

For example, the second candidate frequency domain resources include BWP 2 and BWP 4, and the terminal may randomly select BWP 2 or BWP 4 as the target frequency domain resource according to a preset resource selection rule. In another example, the terminal may use BWP 2 with a smallest value corresponding to the frequency domain resource identification information as the target frequency domain resource. In another example, the terminal may also select BWP 4 with a largest bandwidth value as the target frequency domain resource.

For another example, the second candidate frequency domain resources include BWP 2, BWP 4 and BWP 5, and the terminal may randomly select BWP 4 and BWP 5 as the target frequency domain resource according to the preset resource selection rule. In another example, the terminal may use BWP 2 and BWP 4 as the target frequency domain resource in an order of the values corresponding to the frequency domain resource identification information from smallest to largest. In another example, the terminal may select BWP 4 and BWP 5 as the target frequency domain resource in an order of the bandwidth values from largest to smallest.

In the embodiments of the present disclosure, the preset resource selection rule may also adopt other selection manners, which are not limited in the present disclosure.

In another example, if the number of the second candidate frequency domain resources is a plurality, to improve the reliability of HARQ result feedback, the terminal may use all the second candidate frequency domain resources as the target frequency domain resource, and return the HARQ results through all the second candidate frequency domain resources, that is, the target frequency domain resource.

For example, if the second candidate frequency domain resources include BWP 2, BWP 4, and BWP 5, the terminal uses BWP 2, BWP 4, and BWP 5 as the target frequency domain resource.

For step 203, after the terminal determines the target frequency domain resource, the terminal may directly feed back the HARQ result for the previously received PDSCH to the base station through the target frequency domain resource according to the related art.

Figure 7A:
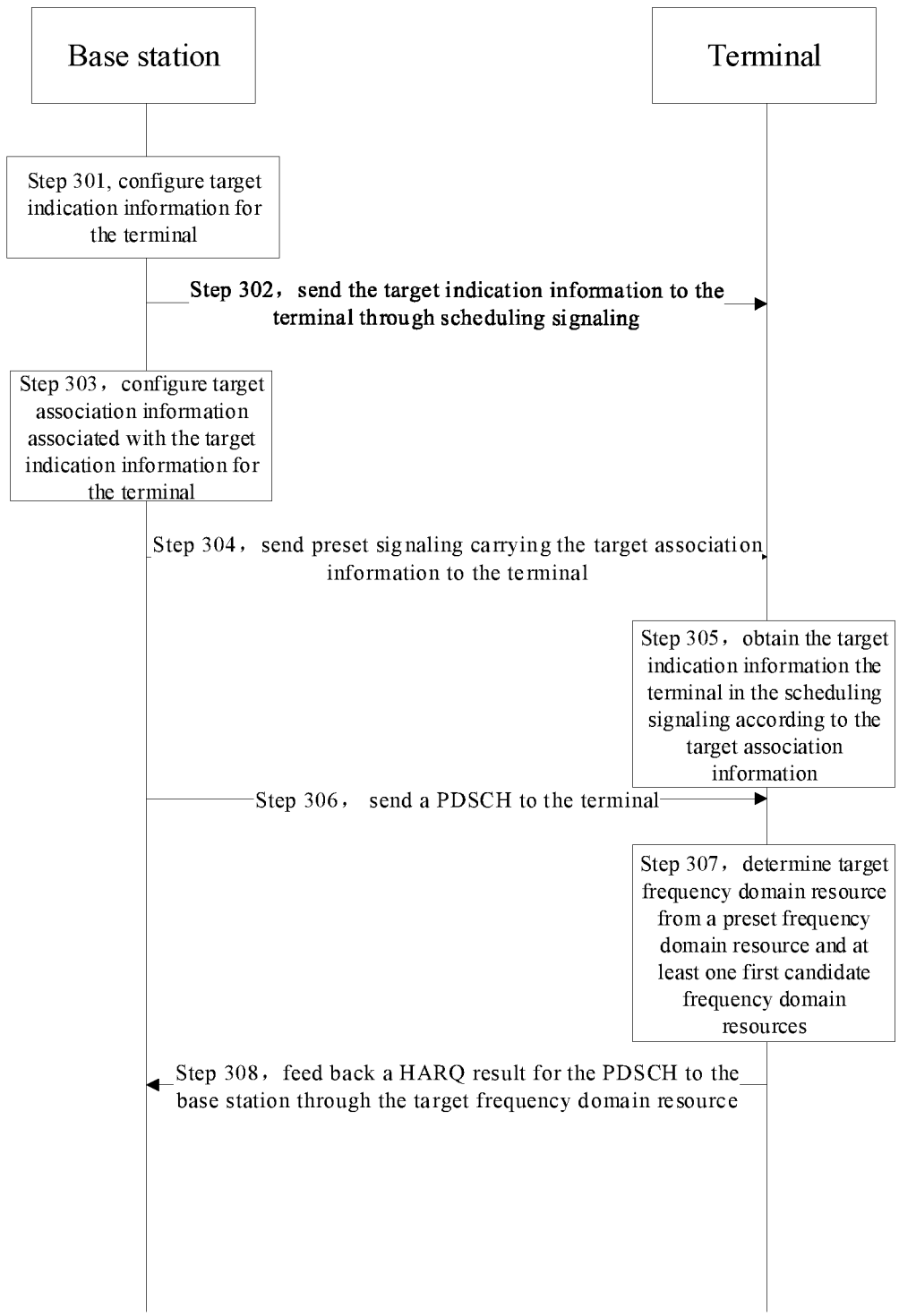
FIG. 7A is a flowchart illustrating another HARQ feedback method according to an example.

In an embodiment, as shown in FIG. 7A, which is a flowchart illustrating another HARQ feedback method according to an example, the method may include the following steps.

At step 301, target indication information is configured by a base station for a terminal, where the target indication information is used to indicate frequency domain resource identification information corresponding to at least one first candidate frequency domain resource.

At step 302, the target indication information is sent by the base station to the terminal through scheduling signaling;

At step 303, target association information associated with the target indication information is configured by the base station for the terminal.

At step 304, preset signaling carrying the target association information is sent by the base station to the terminal.

Optionally, the target association information can also be preset in a communication protocol, and the step 303 and step 304 can be omitted.

At step 305, the target indication information in the scheduling signaling is obtained by the terminal according to the target association information.

In this step, if the target association information is preset in the communication protocol, the terminal can directly obtain the target association information according to the preset target association information.

At step 306, a PDSCH is sent by the base station to the terminal.

At step 307, target frequency domain resource is determined by the terminal from a preset frequency domain resource and the at least one first candidate frequency domain resource.

At step 308, an HARQ result for the PDSCH is fed back by the terminal to the base station through the target frequency domain resource.

The above embodiments are further illustrated as follows.

Figure 7B:
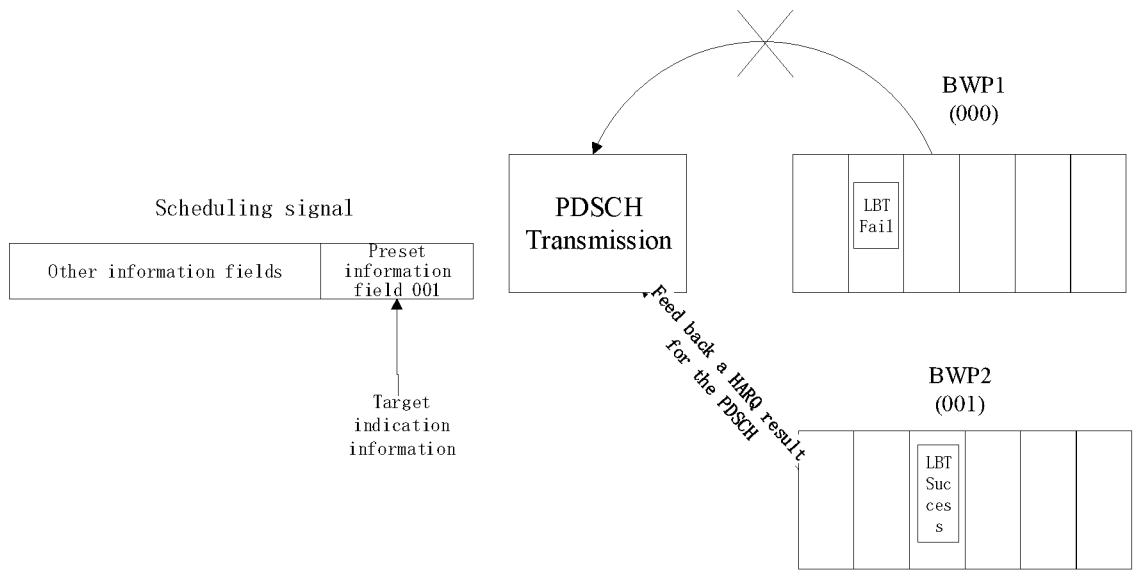
FIGS. 7B to 7C are schematic diagrams illustrating HARQ feedback scenarios according to an example.

Example 1: the scheduling signaling carries the target indication information, and the target indication information is used to indicate frequency domain resource identification information corresponding to a first candidate frequency domain resource, as shown in FIG. 7B. After the terminal receives the PDSCH sent by the base station, the preset frequency domain resource is BWP 1. However, an LBT result of BWP 1 indicates a failure, then the terminal performs LBT on the first candidate frequency domain resource BWP 2, and this LBT result indicates a success. The terminal uses BWP 2 as the target frequency domain resource, and feeds back an HARQ result for the PDSCH through BWP 2.

Figure 7C:
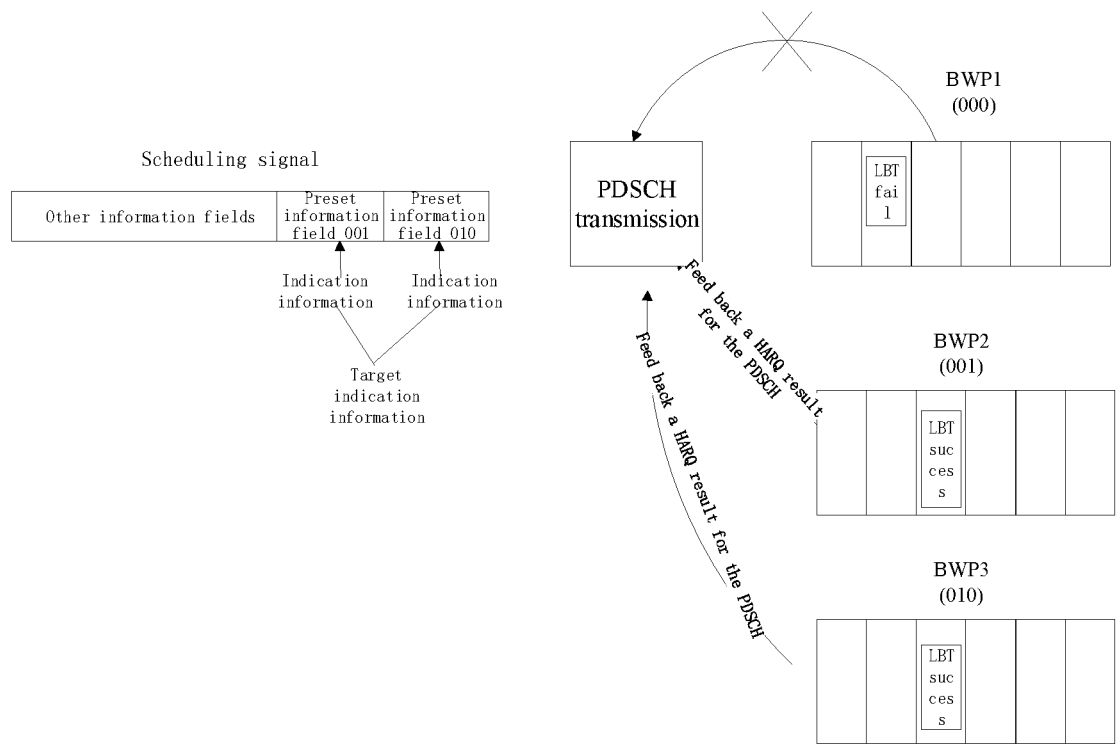

Example 2: the scheduling signaling carries the target indication information, and the target indication information includes two pieces of indication information, which are respectively used to indicate the frequency domain resource identification information corresponding to two first candidate frequency domain resources, as shown in FIG. 7C. After the terminal receives the PDSCH sent by the base station, the preset frequency domain resource is BWP 1. However, an LBT result of BWP 1 indicates a failure, then the terminal performs LBT on the first candidate frequency domain resources BWP 2 and BWP 3, and the LBT results both indicate a success. The terminal can randomly select BWP 2 as the target frequency domain resource according to a preset resource selection rule, and feed back an HARQ result for PDSCH through BWP 2.

In another example, the terminal uses both BWP 2 and BWP 3 as the target frequency domain resource, and feeds back the HARQ result for the PDSCH through BWP 2 and BWP 3.

In the above embodiment, in a communication system with an unlicensed spectrum, at the base station side, target indication information is configured for the terminal, where the target indication information is used to indicate frequency domain resource identification information corresponding to at least one first candidate frequency domain resources; so that the terminal side can determine a target frequency domain resource for performing the HARQ result feedback from a preset frequency domain resource and at least one first candidate frequency domain resources based on target indication information configured by the base station.

A second hybrid automatic repeat request HARQ feedback method provided by the embodiments of the present disclosure can be implemented in a communication system with an unlicensed spectrum, based on a target correspondence configured by a base station, a terminal determines a target frequency domain resource for performing the HARQ result feedback from a preset frequency domain resource and at least one third candidate frequency domain resource.

The following introduces a second HARQ feedback method provided by the embodiment of the present disclosure from a base station side.

Figure 8:
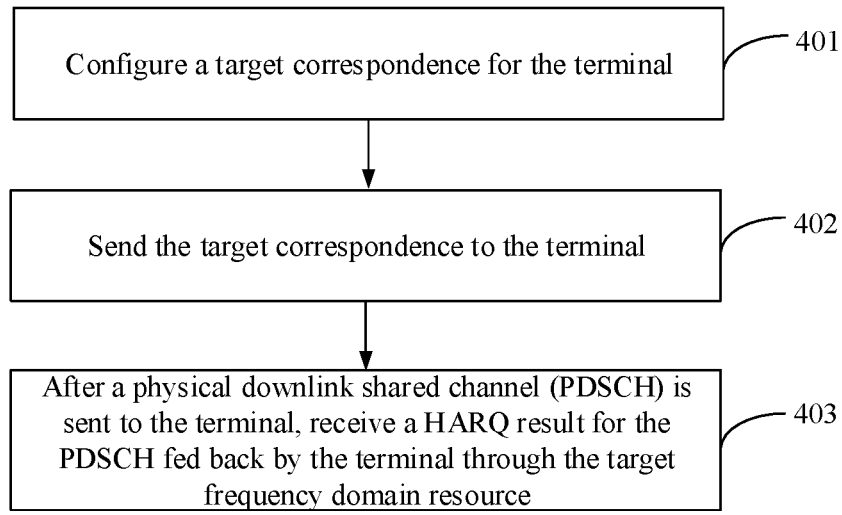
FIG. 8 is a flowchart illustrating another HARQ feedback method according to an example.

The embodiments of the present disclosure provide an HARQ feedback method, which can be applied in a base station. As shown in FIG. 8, which is a flowchart illustrating another HARQ feedback method according to an example, the method may include the following steps.

At step 401, a target correspondence is configured for the terminal, where the target correspondence includes a correspondence between different pieces of frequency domain resource identification information, and each piece of frequency domain resource identification information corresponds to a frequency domain resource.

At step 402, the target correspondence is sent to the terminal.

At step 403, after a physical downlink shared channel (PDSCH) is sent to the terminal, an HARQ result for the PDSCH fed back by the terminal is received through a target frequency domain resource.

The target frequency domain resource is a frequency domain resource for carrying the HARQ result determined by the terminal. After the terminal determines at least one third candidate frequency domain resource corresponding to a preset frequency domain resource based on the target correspondence, the terminal determines the target frequency domain resource according to the preset frequency domain resource and the at least one third candidate frequency domain resource.

In the above embodiment, in the communication system with the unlicensed spectrum, a target correspondence is configured for the terminal on the base station side, so that the terminal side can determine, based on the target correspondence, a target frequency domain resource for performing HARQ result feedback from a preset frequency domain resources and at least one third candidate frequency domain resource corresponding to the preset frequency domain resource.

For the foregoing step 401, the target correspondence configured by the base station for the terminal may be as shown in Table 1.

TABLE 1

| Frequency domain resource identification information | Corresponding frequency domain resource identification information |
|---|---|
| Frequency domain resource identification information on BWP 1 | Frequency domain resource identification information on BWP 2, Frequency domain resource identification information on BWP 5 |
| Frequency domain resource identification information on BWP 3 | Frequency domain resource identification information on BWP 4 |
| Frequency domain resource identification information on BWP 6, Frequency domain resource identification information on BWP 7 | Frequency domain resource identification information on BWP 8 |
| . . . | . . . |

The correspondence in Table 1 can be that: one piece of frequency domain resource identification information corresponds to another piece of frequency domain resource identification information, one piece of frequency domain resource identification information corresponds to multiple pieces of frequency domain resource identification information, or multiple pieces of frequency domain resource identification information correspond to one piece of frequency domain resource identification information, which are not limited by the present disclosure.

For step 402, the base station can send Table 1 to the terminal through preset signaling, such as RRC signaling, MAC signaling, or physical layer signaling.

For step 403, the base station can send the PDSCH to the terminal according to the related art, and the terminal first determines at least one third candidate frequency domain resource corresponding to the preset frequency domain resource based on the target correspondence, and then determines the target frequency domain resource from the preset frequency domain resource and the at least one third candidate frequency domain resource, and feeds back the HARQ result for the PDSCH through the target frequency domain resource.

The following introduces a second HARQ feedback method provided by the embodiments of the present disclosure from the terminal side.

Figure 9:
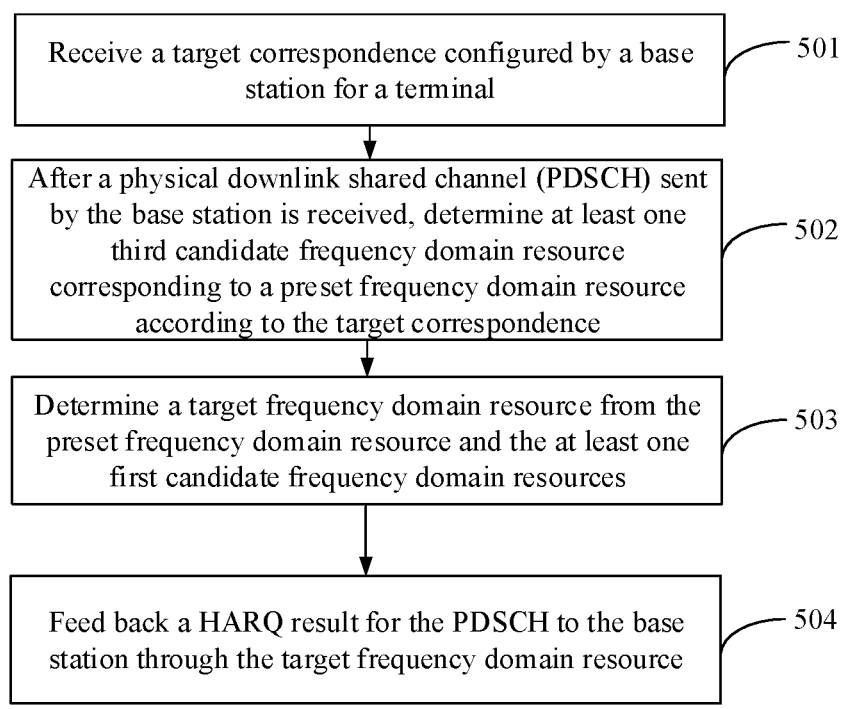
FIG. 9 is a flowchart illustrating another HARQ feedback method according to an example.

The embodiments of the present disclosure provide another HARQ feedback method, which can be applied in a terminal. As shown in FIG. 9, which is a flowchart illustrating another HARQ feedback method according to an example, the method may include the following steps.

At step 501, a target correspondence configured by a base station for a terminal is received, where the target correspondence includes a correspondence between different pieces of frequency domain resource identification information, and each piece of frequency domain resource identification information corresponds to a frequency domain resource.

At step 502, after a physical downlink shared channel (PDSCH) sent by the base station is received, at least one third candidate frequency domain resource corresponding to a preset frequency domain resource is determined according to the target correspondence.

At step 503, a target frequency domain resource is determined from the preset frequency domain resource and the at least one first candidate frequency domain resources.

At step 504, an HARQ result for the PDSCH is fed back to the base station through the target frequency domain resource.

In the above embodiment, it can be implemented that in a communication system with an unlicensed spectrum, based on target correspondence configured by the base station, the terminal determines a target frequency domain resource for performing the HARQ result feedback from a preset frequency domain resource and at least one third candidate frequency domain resource.

For the step 501, the terminal can receive the target correspondence configured by the base station for the terminal through preset signaling, such as RRC signaling, MAC signaling, or physical layer signaling. The target correspondence may be as shown in Table 1.

For the step 502, after the target correspondence is received, the terminal can lookup Table 1 to find the frequency domain resource identification information corresponding to frequency domain resource identification information of the preset frequency domain resource. The preset frequency domain resource may be a frequency domain resource used for uplink data transmission corresponding to the frequency domain resource used by the terminal to receive the PDSCH sent by the base station, where the correspondence is informed to the terminal in advance by the base station. For example, the frequency domain resource identification information of the preset frequency domain resource is the frequency domain resource identification information of BWP 1, and after looking up Table 1, it is determined that the corresponding frequency domain resource identification information is the frequency domain resource identification information of BWP 2 and the frequency domain resource identification information of BWP 5.

Further, the terminal uses the frequency domain resource indicated by the frequency domain resource identification information corresponding to the frequency domain resource identification information of the preset frequency domain resource as the third candidate frequency domain resource corresponding to the preset frequency domain resource, for example, uses BWP 2 and BWP 5 as the third candidate frequency domain resources.

Figure 10:
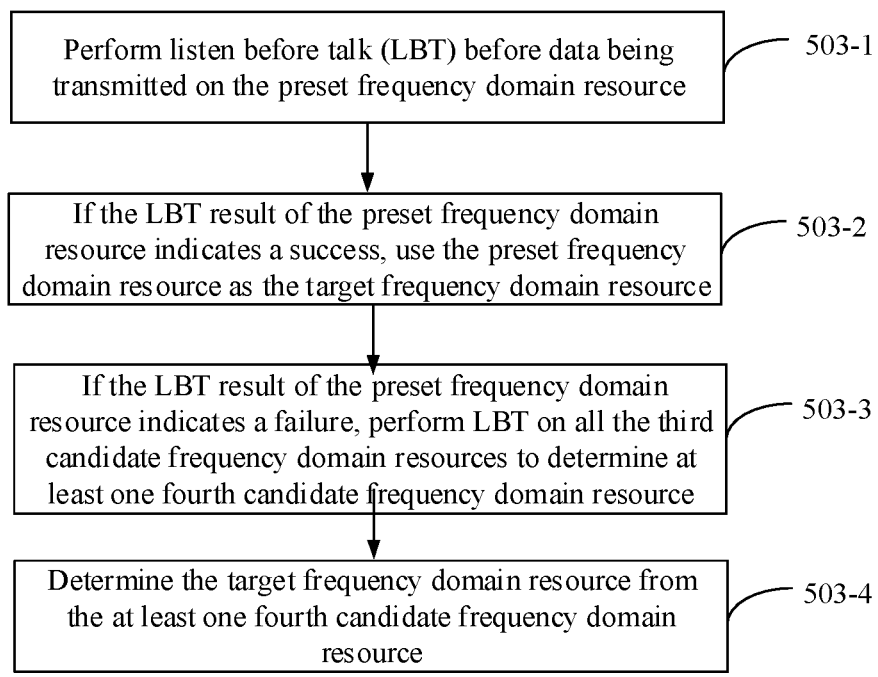
FIG. 10 is a flowchart illustrating another HARQ feedback method according to an example.

For the step 503, as shown in FIG. 10, FIG. 10 is a flowchart of another HARQ feedback method according to the embodiment shown in FIG. 9. Step 503 may include the following steps:

At step 503-1, listen before talk (LBT) is performed before data being transmitted on the preset frequency domain resource.

In this step, the terminal may first perform LBT on the preset frequency domain resources according to related art.

At step 503-2, if the LBT result of the preset frequency domain resource indicates a success, the preset frequency domain resource is used as the target frequency domain resource.

In this step, if the LBT result of the preset frequency domain resource indicates a success, it means that the terminal successfully contends for a current channel. The HARQ result can be fed back through the preset frequency domain resource. Therefore, the terminal can directly use the preset frequency domain resource as the target frequency domain resource.

At step 503-3, if the LBT result of the preset frequency domain resource indicates a failure, LBT is performed on all the third candidate frequency domain resources to determine at least one fourth candidate frequency domain resources.

In this step, if the LBT result of the terminal on the preset frequency domain resource indicates a failure, it means that the terminal fails in contending for the current channel. At this time, the target frequency domain resource needs to be determined among the third candidate frequency domain resources.

Further, the terminal may perform LBT on all the third candidate frequency domain resources, and use the third candidate frequency domain resource whose LBT result is successful as the fourth candidate frequency domain resource.

At step 503-4, the target frequency domain resource is determined from the at least one fourth candidate frequency domain resource.

In this step, if the number of the fourth candidate frequency domain resource is one, the terminal may directly use the one fourth candidate frequency domain resource as the target frequency domain resource.

If the number of the fourth candidate frequency domain resources is a plurality, the terminal may select one or more fourth candidate resources from the fourth candidate frequency domain resources according to a preset resource selection rule as the target frequency domain resources.

In the embodiments of the present disclosure, the resource selection rule may be that one or more frequency domain resources are randomly selected by the terminal, or one or more frequency domain resources may be selected according to a value corresponding to the frequency domain resource identification information in an ascending order, or one or more frequency domain resources may be selected according to a bandwidth value in a descending order.

In the embodiments of the present disclosure, the preset resource selection rule may also adopt other selection methods, which are not limited in the present disclosure.

In another example, if the number of the fourth candidate frequency domain resources is a plurality, in order to improve the reliability of HARQ result feedback, the terminal may use all the fourth candidate frequency domain resources as the target frequency domain resources, and return the HARQ results through all the fourth candidate frequency domain resources, that is, the target frequency domain resources.

For the step 504, after the terminal determines the target frequency domain resource, the terminal may directly feed back the HARQ result for the previously received PDSCH to the base station through the target frequency domain resource according to the related art.

Figure 11A:
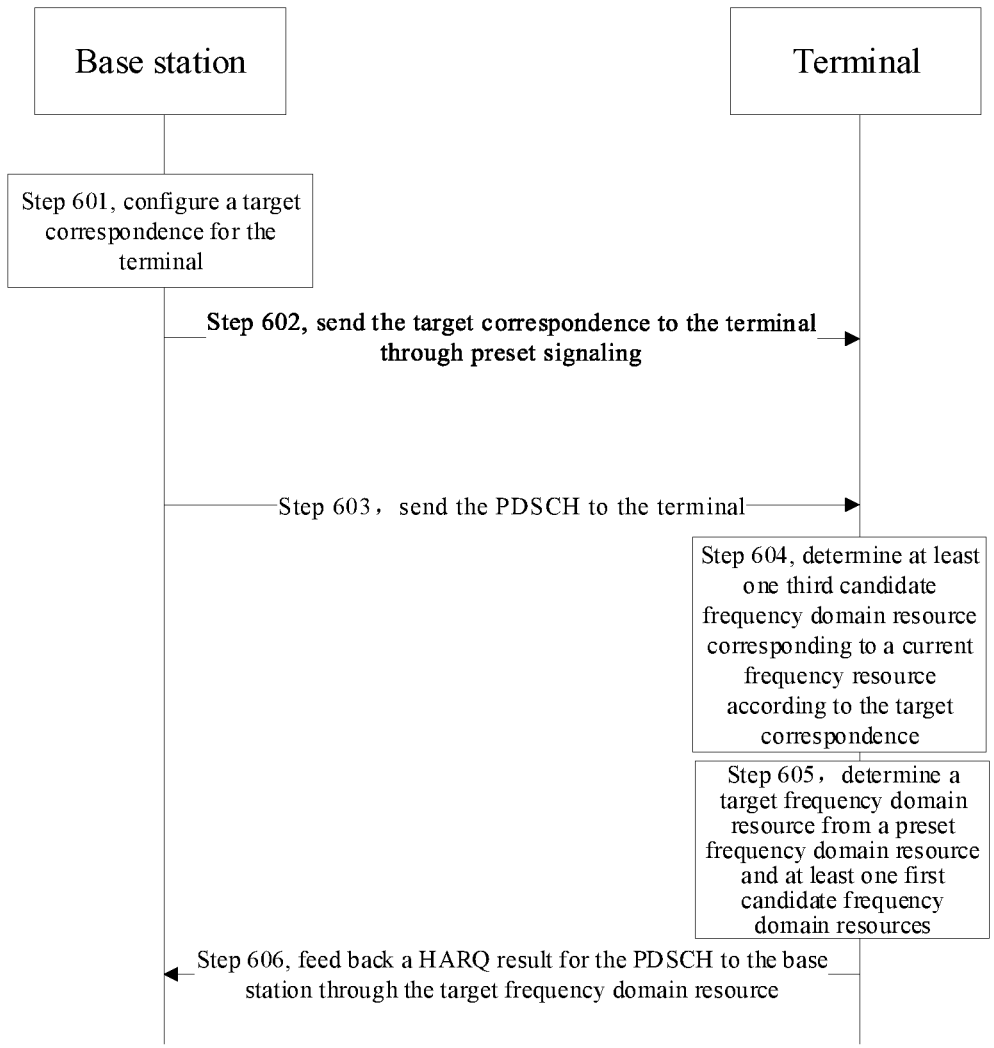
FIG. 11A is a flowchart illustrating another HARQ feedback method according to an example.
Figure 11B:
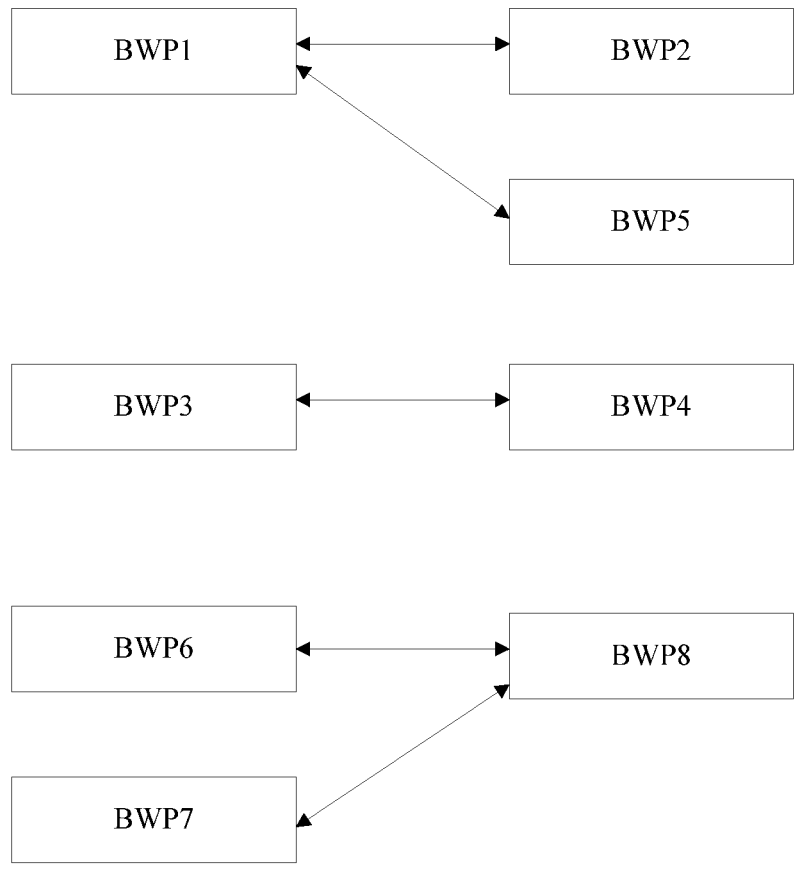
FIG. 11B is a schematic diagram illustrating an HARQ feedback method according to an example.

As shown in FIG. 11A, which is a flowchart illustrating another HARQ feedback method according to an example, the method may include the following steps:

At step 601, a target correspondence is configured by a base station for a terminal;

The target correspondence includes the correspondence between frequency domain resource identification information corresponding to different frequency domain resources, thereby forming a correspondence between frequency domain resources, for example, as shown in FIG. 11B.

At step 602, the target correspondence is sent by the base station to the terminal through preset signaling;

At step 603, a PDSCH is sent by the base station to the terminal.

At step 604, at least one third candidate frequency domain resource corresponding to a current frequency resource is determined according to the target correspondence.

At step 605, a target frequency domain resource is determined by the terminal from a preset frequency domain resource and at least one third candidate frequency domain resources.

At step 606, an HARQ result for the PDSCH is fed back by the terminal to the base station through the target frequency domain resource.

In the above embodiment, in the communication system of the unlicensed spectrum, a target correspondence is configured for the terminal on the base station side, so that the terminal side can determine a target frequency domain resource for performing HARQ result feedback based on the target correspondence from a preset frequency domain resources and at least one third candidate frequency domain resource corresponding to the preset frequency domain resource.

In the third hybrid automatic repeat request HARQ feedback method provided by the embodiments of the present disclosure, it can be implemented that in a communication system with an unlicensed spectrum, based on a preset target correspondence, the terminal can determine a target frequency domain resource for performing the HARQ result feedback from a preset frequency domain resource and at least one fifth candidate frequency domain resource.

The following introduces the third HARQ feedback method provided by the embodiments of the present disclosure from the base station side.

Figure 12:
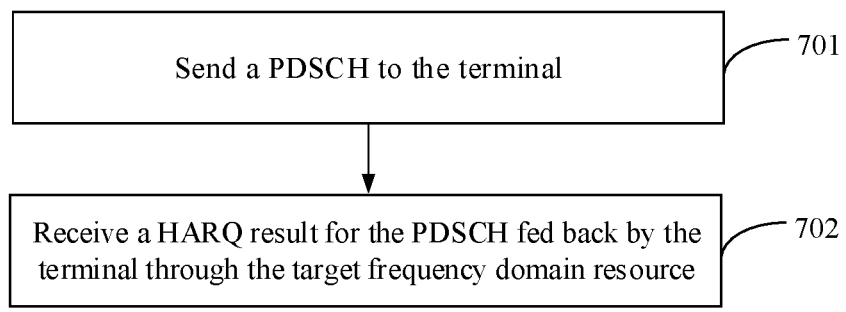
FIG. 12 is a flowchart illustrating another HARQ feedback method according to an example.

The embodiments of the present disclosure provide an HARQ feedback method, which can be applied in a base station. As shown in FIG. 12, which is a flowchart illustrating an HARQ feedback method according to an example, the method may include the following steps:

At step 701, a PDSCH is sent to a terminal.

At step 702, an HARQ result for the PDSCH fed back by the terminal is received through the target frequency domain resource.

The target frequency domain resource is a frequency domain resource for carrying the HARQ result determined, after the terminal determines at least one fifth candidate frequency domain resource corresponding to the preset frequency domain resource according to the preset target correspondence, from the preset frequency domain resource and the at least one fifth frequency domain resource; where the correspondence includes correspondences between frequency domain resources corresponding to different frequency domain resources.

In the above embodiment, the base station does not need to configure the target correspondence for the terminal. The target correspondence is preset, and the base station only needs to send the PDSCH to the terminal. In a communication system with an unlicensed spectrum, based on the preset target correspondence, the terminal can determine the target frequency domain resource from the preset frequency domain resource and at least one fifth candidate frequency domain resource corresponding to the preset frequency domain resource.

For the step 701, the base station can send the PDSCH to the terminal according to related art.

For the step 702, after receiving the PDSCH, the terminal first determines at least one fifth candidate frequency domain resource corresponding to the preset frequency domain resource based on the target correspondence preset in a communication protocol, and then determines a target frequency domain resource from the preset frequency domain resource and the at least one fifth candidate frequency domain resource, and feeds back the HARQ result for the PDSCH through the target frequency domain resource.

The following introduces the third HARQ feedback method provided by the embodiments of the present disclosure from the terminal side.

Figure 13:
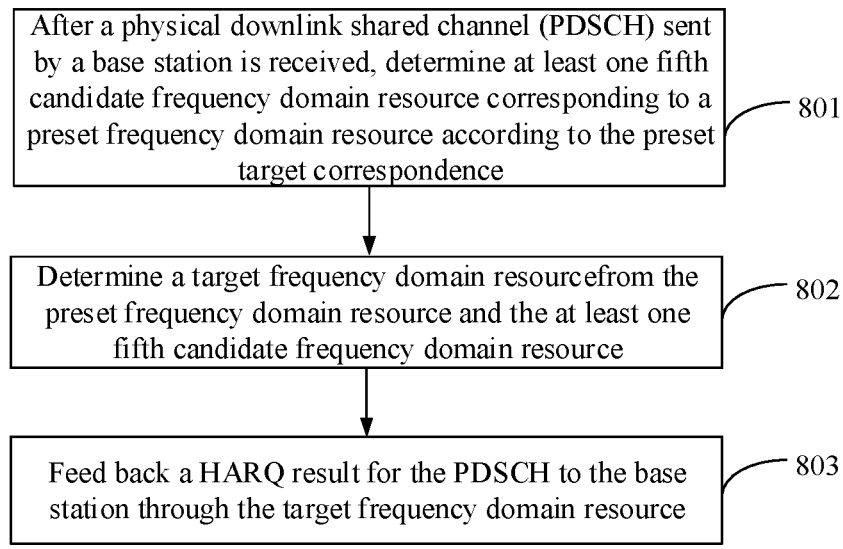
FIG. 13 is a flowchart illustrating an HARQ feedback method according to an example.

The embodiments of the present disclosure provide an HARQ feedback method, which can be applied in a terminal. As shown in FIG. 13, which is a flowchart illustrating an HARQ feedback method according to an example, the method may include the following steps:

At step 801, after a physical downlink shared channel (PDSCH) sent by a base station is received, at least one fifth candidate frequency domain resource corresponding to a preset frequency domain resource is determined according to the preset target correspondence; wherein the target correspondence comprises correspondences between frequency domain resource identification information corresponding to different frequency domain resources;

At step 802, a target frequency domain resource is determined from the preset frequency domain resource and the at least one fifth candidate frequency domain resource.

At step 803, an HARQ result for the PDSCH is fed back to the base station through the target frequency domain resource.

In the above embodiment, after receiving the PDSCH sent by the base station, the terminal can quickly determine at least one fifth candidate frequency domain resource corresponding to the preset frequency domain resource directly according to the preset target correspondence. In a communication system with an unlicensed spectrum, the purpose of determining the target frequency resource among the preset frequency domain resources and the at least one fifth candidate frequency domain resource on the terminal side based on the preset target correspondence is realized.

For the step 801, after receiving the PDSCH sent by the base station, the terminal can obtain the preset target correspondence, for example, Table 1, and find the frequency domain resource identification information corresponding to the preset frequency domain resource identification information according to the target correspondence.

Further, the terminal uses the frequency domain resource indicated by the frequency domain resource identification information corresponding to the frequency domain resource identification information of the preset frequency domain resource as a fifth candidate frequency domain resource corresponding to the preset frequency domain resource.

The preset frequency domain resource may be a frequency domain resource used for uplink data transmission corresponding to the frequency domain resource used by the terminal to receive the PDSCH sent by the base station, where the correspondence is informed to the terminal in advance by the base station.

Figure 14:
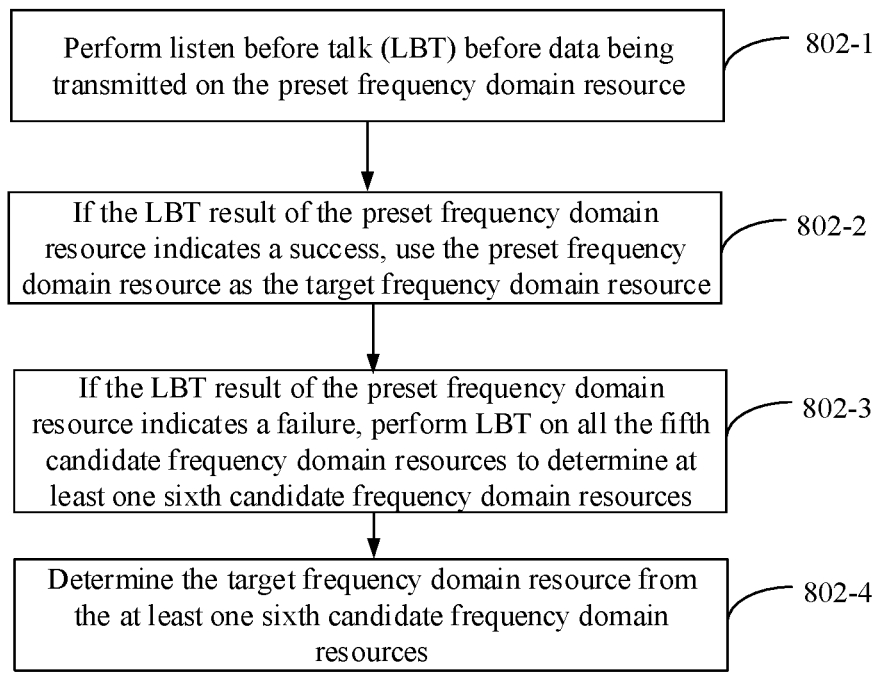
FIG. 14 is a flowchart illustrating an HARQ feedback method according to an example.

For the step 802, as shown in FIG. 14, which is a flowchart illustrating another HARQ feedback method based on the embodiment of FIG. 13. Step 802 may include the following steps:

At step 802-1, listen before talk (LBT) is performed before data being transmitted on the preset frequency domain resource.

In this step, the terminal may first perform LBT on the preset frequency domain resources according to related art.

At step 802-2, if the LBT result of the preset frequency domain resource indicates a success, the preset frequency domain resource is used as the target frequency domain resource.

In this step, if the LBT result of the preset frequency domain resource indicates a success, it means that the terminal successfully contends for a current channel. The HARQ result can be fed back through the preset frequency domain resource. Therefore, the terminal can directly use the preset frequency domain resource as the target frequency domain resource.

At step 802-3, if the LBT result of the preset frequency domain resource indicates a failure, LBT is performed on all the fifth candidate frequency domain resources to determine at least one sixth candidate frequency domain resource.

In this step, if the LBT result of the terminal on the preset frequency domain resource indicates a failure, it means that the terminal fails in contending for the current channel. At this time, the target frequency domain resource needs to be determined among the fifth candidate frequency domain resources.

Further, the terminal may perform LBT on all the fifth candidate frequency domain resources, and use the fifth candidate frequency domain resources whose LBT result is successful as the sixth candidate frequency domain resources.

At step 802-4, the target frequency domain resource is determined from the at least one sixth candidate frequency domain resource.

In this step, if the number of the sixth candidate frequency domain resource is one, the terminal may directly use the sixth candidate frequency domain resource as the target frequency domain resource.

If the number of the sixth candidate frequency domain resources is a plurality, the terminal may select one or more sixth candidate resources from the sixth candidate frequency domain resources according to a preset resource selection rule as the target frequency domain resources.

In the embodiments of the present disclosure, the resource selection rule may be that one or more frequency domain resources are randomly selected by the terminal, or one or more frequency domain resources may be selected according to a value corresponding to the frequency domain resource identification information in an ascending order, or one or more frequency domain resources may be selected according to a bandwidth value in a descending order.

In the embodiments of the present disclosure, the preset resource selection rule may also adopt other selection methods, which are not limited in the present disclosure.

In another example, if the number of the sixth candidate frequency domain resources is a plurality, in order to improve the reliability of HARQ result feedback, the terminal may use all the sixth candidate frequency domain resources as the target frequency domain resources, and return the HARQ results through all the sixth candidate frequency domain resources, that is, the target frequency domain resources.

For the step 803, after the terminal determines the target frequency domain resource, the terminal may directly feed back the HARQ result for the previously received PDSCH to the base station through the target frequency domain resource according to the related art.

Figure 15:
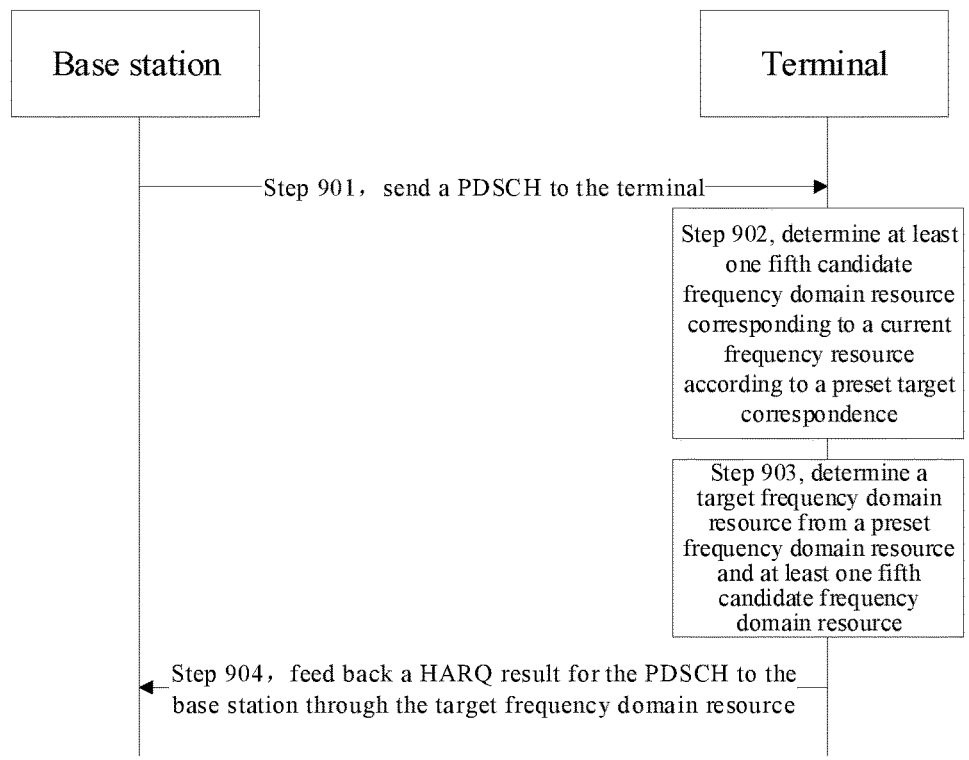
FIG. 15 is a flowchart illustrating another HARQ feedback method according to an example.

In an embodiment, as shown in FIG. 15, which is a flowchart illustrating another HARQ feedback method according to an example. The method may include the following steps:

At step 901, a PDSCH is sent by a base station to a terminal.

At step 902, at least one fifth candidate frequency domain resource corresponding to a current frequency resource is determined by the terminal according to a preset target correspondence.

At step 903, a target frequency domain resource is determined by the terminal from a preset frequency domain resource and at least one fifth candidate frequency domain resource.

At step 904, an HARQ result for the PDSCH is fed back by the terminal to the base station through the target frequency domain resource.

In the above embodiment, the base station does not need to configure the target correspondence for the terminal. The target correspondence is preset, and the base station only needs to send the PDSCH to the terminal. In a communication system with an unlicensed spectrum, based on the preset target correspondence, the terminal can determine the target frequency domain resource from the preset frequency domain resource and at least one fifth candidate frequency domain resource corresponding to the preset frequency domain resource.

Corresponding to the above method examples implementing application functions, the present disclosure also provides examples of apparatuses and corresponding base stations and terminals for implementing application functions.

Figure 16:
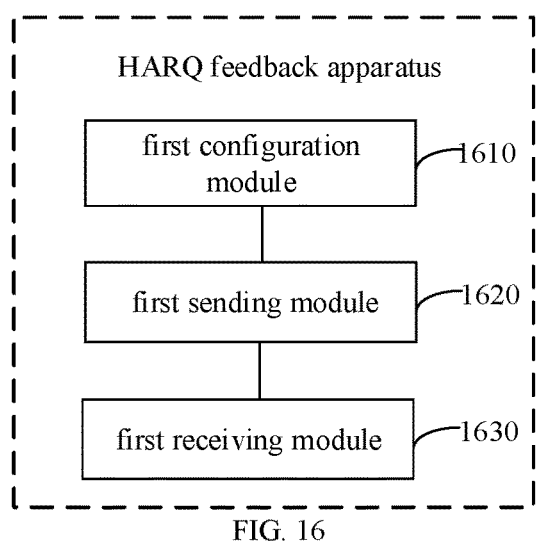
FIG. 16 is a block diagram illustrating an HARQ feedback apparatus according to an example.

As shown in FIG. 16, which is a block diagram illustrating an HARQ feedback apparatus according to an example, the apparatus is applied in a base station and includes:

a first configuration module 1610, configured to configure target indication information for the terminal; the target indication information is used to indicate frequency domain resource identification information corresponding to at least one first candidate frequency domain resources;

a first sending module 1620, configured to send the target indication information to the terminal;

a first receiving module 1630, configured to, after a physical downlink shared channel (PDSCH) is sent to the terminal, receive an HARQ result for the PDSCH fed back by the terminal through a target frequency domain resource;

wherein the target frequency domain resource is a frequency domain resource for carrying the HARQ result determined by the terminal from a preset frequency domain resource and at least one first candidate frequency domain resources.

Figure 17:
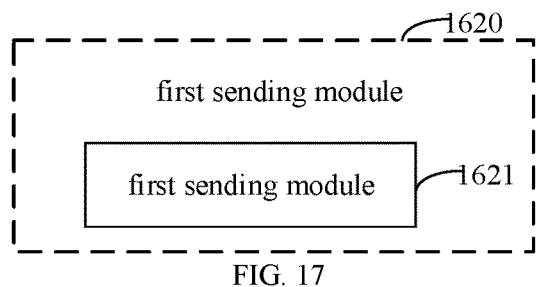
FIG. 17 is a block diagram illustrating another HARQ feedback apparatus according to an example.

As shown in FIG. 17, which is block diagram illustrating another HARQ feedback apparatus according to an example, the first sending module 1620 includes:

a first sending module 1621, configured to send the target indication information to the terminal through scheduling signaling;

Optionally, if the number of the first candidate frequency domain resources is a plurality, the target indication information includes the plurality of pieces of indication information for indicating frequency domain resource identification information respectively corresponding to the plurality of first candidate frequency domain resources, and the information contents of each piece of indication information is carried by a preset information field in the scheduling signaling.

Optionally, if the number of the first candidate frequency domain resources is a plurality, information contents of the target indication information is carried by a preset information field in the scheduling signaling.

Figure 18:
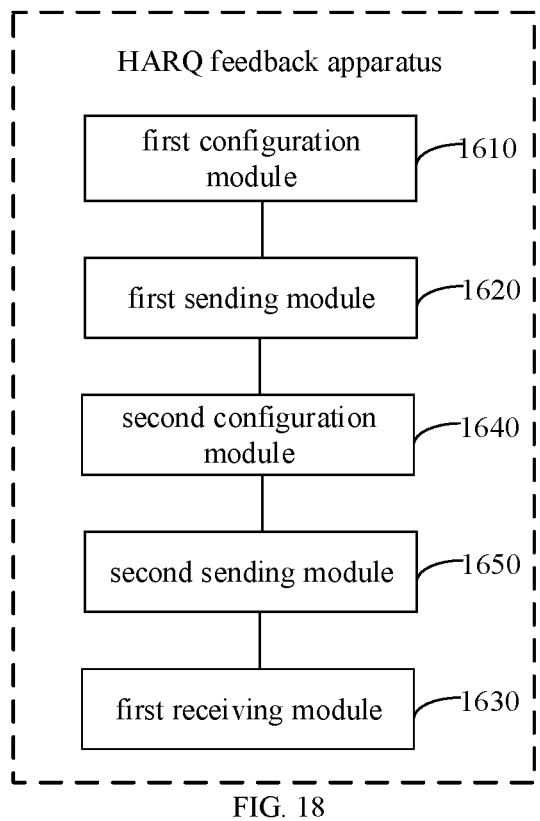
FIG. 18 is a block diagram illustrating another HARQ feedback apparatus according to an example.
Figure 19:
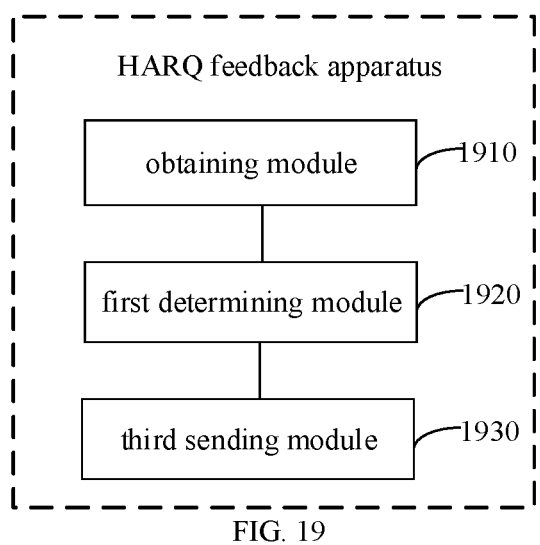
FIG. 19 is a block diagram illustrating another HARQ feedback apparatus according to an example.

As shown in FIG. 18, which is block diagram illustrating another HARQ feedback apparatus based on the embodiment of FIG. 16, the apparatus further includes:
- a second configuration module 1640, configured to configure target association information associated with the target indication information for the terminal; the target association information includes at least one of target location information or target length information, and the target location information is used to indicate starting position information about the target indication information in the scheduling signaling, and the target length information is used to indicate a corresponding length value of the target indication information in the scheduling signaling;
- a second sending module 1650, configured to send the target association information to the terminal through preset signaling;

As shown in FIG. 19, which is block diagram illustrating another HARQ feedback apparatus according to an example, the apparatus is applied in a terminal and includes:
- an obtaining module 1910, configured to obtain target indication information configured by the base station for the terminal; the target indication information is used to indicate frequency domain resource identification information corresponding to at least one first candidate frequency domain resources;
- a first determining module 1920, configured to, after a PDSCH sent by the base station is received, determine a target frequency domain resource from a preset frequency domain resource and at least one first candidate frequency domain resources;
- a third sending module 1930, configured to, feed back an HARQ result for the PDSCH to the base station.

Figure 20:
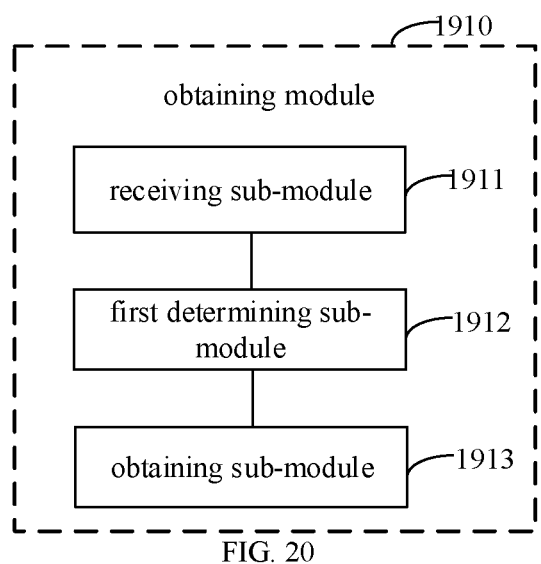
FIG. 20 is a block diagram illustrating another HARQ feedback apparatus according to an example.

As shown in FIG. 20, which is block diagram illustrating another HARQ feedback apparatus based on the embodiment of FIG. 19, the apparatus includes:
- a receiving sub-module 1911, configured to receive scheduling information carrying the target indication information sent by the base station;
- a first determining sub-module 1912, configured to determine target association information associated with the target indication information; the target association information includes at least one of target location information or target length information, and the target location information is used to indicate starting position information about the target indication information in the scheduling signaling, and the target length information is used to indicate a corresponding length value of the target indication information in the scheduling signaling;
- an obtaining sub-module 1913, configured to obtain the target indication information from the scheduling signaling according to the target association information.

Figure 21:
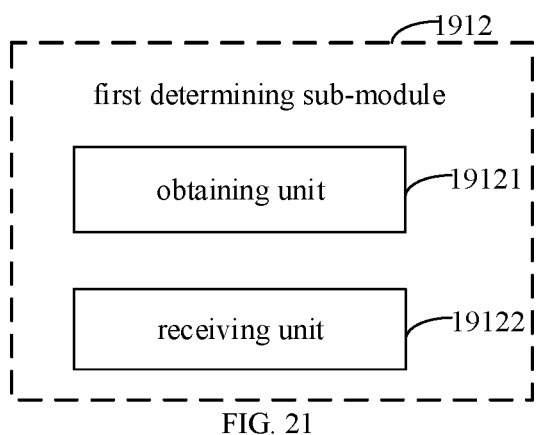
FIG. 21 is a block diagram illustrating another HARQ feedback apparatus according to an example.

As shown in FIG. 21, which is block diagram illustrating another HARQ feedback apparatus based on the embodiment of FIG. 20, the first determining sub-module 1912 includes:
- an obtaining unit 19121, configured to obtain preset target association information associated with the target indication information; or
- a receiving unit 19122, configured to receive the target association information sent by the base station through preset signaling.

Figure 22:
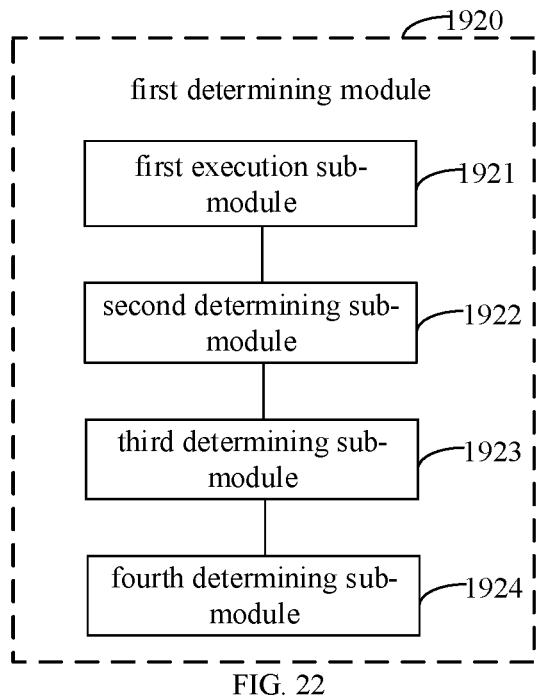
FIG. 22 is a block diagram illustrating another HARQ feedback apparatus according to an example.

As shown in FIG. 22, which is block diagram illustrating another HARQ feedback apparatus based on the embodiment of FIG. 19, the first determining module 1920 includes:
- a first execution sub-module 1921, configured to perform listen before talk (LBT) before data being transmitted on the preset frequency domain resource;
- a second determining sub-module 1922, configured to, if a LBT result of the preset frequency domain resource indicates a success, use the preset frequency domain resource as the target frequency domain resource;
- a third determining sub-module 1923, configured to, if the LBT result of the preset frequency domain resource indicates a failure, perform LBT on all the first candidate frequency domain resources, and determine at least one second candidate frequency domain resource, where each of the at least one second candidate frequency domain resource is a first candidate frequency domain resources whose LBT result is successful;
- a fourth determining sub-module 1924, configured to determine the target frequency domain resource from the at least one second candidate frequency domain resources.

Figure 23:
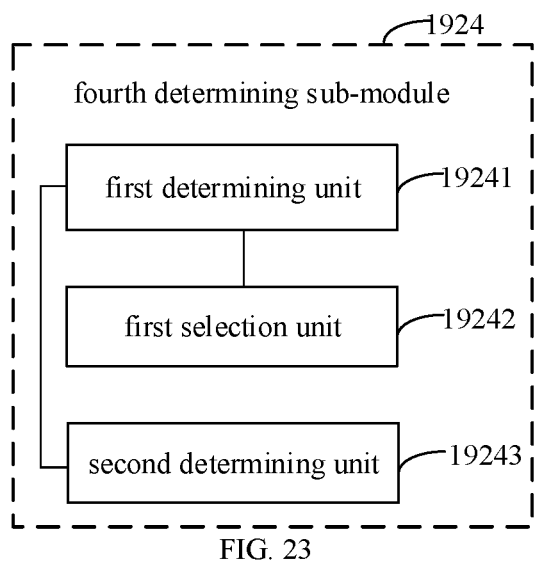
FIG. 23 is a block diagram illustrating another HARQ feedback apparatus according to an example.

As shown in FIG. 23, which is block diagram illustrating another HARQ feedback apparatus based on the embodiment of FIG. 22, the fourth determining sub-module 1924 includes:
- a first determining unit 19241, configured to, if the number of the second candidate frequency domain resources is one, determine the one second candidate frequency domain resource as the target frequency domain resource;
- a first selection unit 19242, configured to if the number of the second candidate frequency domain resources is a plurality, select one or more second candidate frequency domain resources from the plurality of second candidate frequency domain resources as the target frequency domain resources according to a preset resource selection rule; or
- a second determining unit 19243, configured to use all of the at least one second candidate frequency domain resource as the target frequency domain resource.

Figure 24:
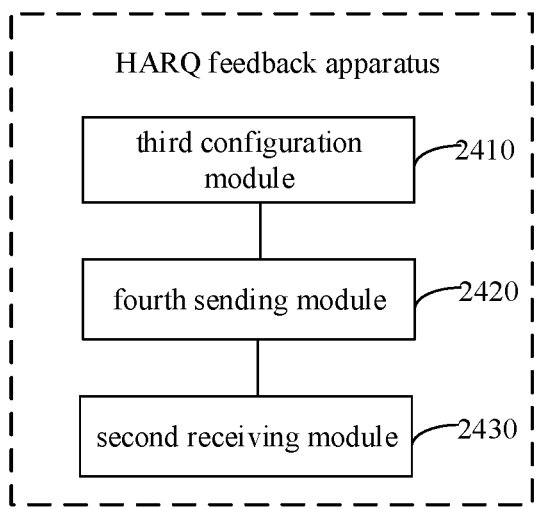
FIG. 24 is a block diagram illustrating another HARQ feedback apparatus according to an example.

As shown in FIG. 24, which is block diagram illustrating another HARQ feedback apparatus according to an example, the apparatus is applied in a base station and includes:
- a third configuration module 2410, configured to configure a target correspondence for the terminal, where the target correspondence includes a correspondence between frequency domain resource identification information corresponding to different frequency domain resources;
- a fourth sending module 2420, configured to send the target correspondence to the terminal;
- a second receiving module 2430, configured to, after a physical downlink shared channel (PDSCH) is sent to the terminal, receive an HARQ result for the PDSCH fed back by the terminal through a target frequency domain resource;
- wherein the target frequency domain resource is a frequency domain resource for carrying the HARQ result determined from a preset frequency domain resource and at least one third candidate frequency domain resource by the terminal, after the terminal determines at least one third candidate frequency domain resource corresponding to a preset frequency domain resource based on the target correspondence.

Figure 25:
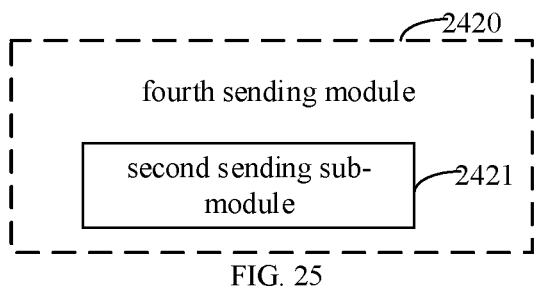
FIG. 25 is a block diagram illustrating another HARQ feedback apparatus according to an example.

As shown in FIG. 25, which is block diagram illustrating another HARQ feedback apparatus based on the embodiment of FIG. 24, the fourth sending module 2420 includes:
- a second sending sub-module 2421, configured to send the target correspondence to the terminal through preset signaling.

Figure 26:
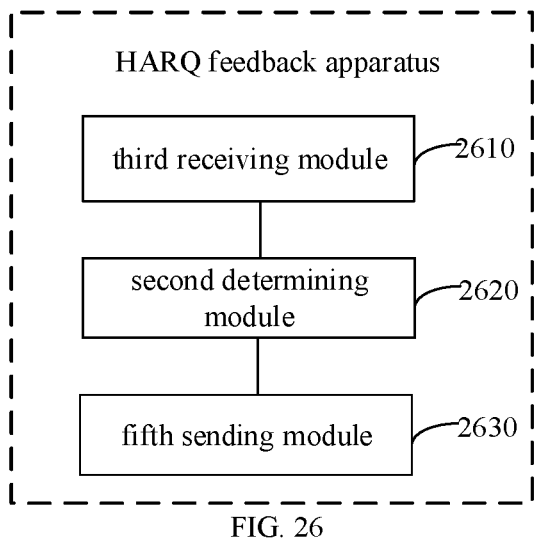
FIG. 26 is a block diagram illustrating another HARQ feedback apparatus according to an example.

As shown in FIG. 26, which is block diagram illustrating another HARQ feedback apparatus according to an example, the apparatus is applied in a terminal and includes:
- a third receiving module 2610, configured to receive a target correspondence configured by a base station for the terminal, where the target correspondence includes correspondences between frequency domain resource identification information corresponding to different frequency domain resources;
- a second determining module 2620, configured to, after a physical downlink shared channel (PDSCH) sent by the base station is received, determine at least one third candidate frequency domain resource corresponding to a preset frequency domain resource according to the target correspondence;
- a fifth sending module 2630, configured to, feed back an HARQ result for the PDSCH to the base station through the target frequency domain resource.

Figure 27:
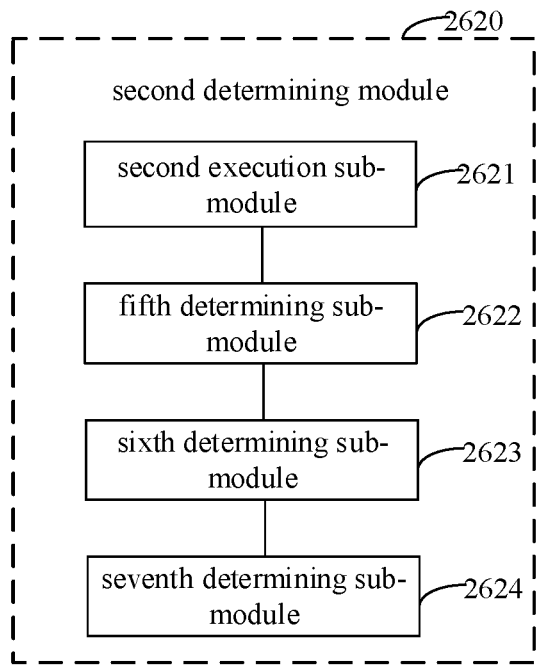
FIG. 27 is a block diagram illustrating another HARQ feedback apparatus according to an example.

As shown in FIG. 27, which is block diagram illustrating another HARQ feedback apparatus based on the embodiment of FIG. 26, the second determining module 2620 includes:
- a second execution sub-module 2621, configured to perform listen before talk (LBT) before data being transmitted on the preset frequency domain resource;
- a fifth determining sub-module 2622, configured to, if a LBT result of the preset frequency domain resource indicates a success, use the preset frequency domain resource as the target frequency domain resource;
- a sixth determining sub-module 2623, configured to, if the LBT result of the preset frequency domain resource indicates a failure, perform LBT on all the third candidate frequency domain resources, and determine at least one fourth candidate frequency domain resource, wherein each of the at least one fourth candidate frequency domain resources is a third candidate frequency domain resources whose LBT result is successful;
- a seventh determining sub-module 2624, configured to determine the target frequency domain resource from the at least one fourth candidate frequency domain resource.

Figure 28:
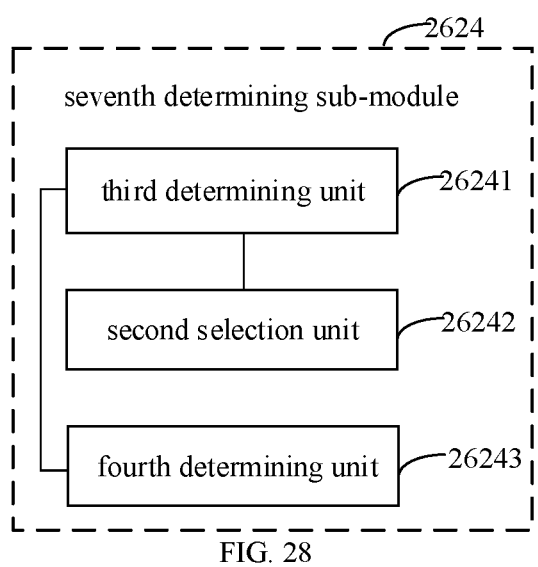
FIG. 28 is a block diagram illustrating another HARQ feedback apparatus according to an example of the present disclosure.

As shown in FIG. 28, which is block diagram illustrating another HARQ feedback apparatus based on the embodiment of FIG. 27, the seventh determining sub-module 2624 includes:
- a third determining unit 26241, configured to, if the number of the fourth candidate frequency domain resources is one, determine the one fourth candidate frequency domain resource as the target frequency domain resource;
- a second selection unit 26242, configured to if the number of the fourth candidate frequency domain resources is a plurality, select one or more fourth candidate frequency domain resources from the plurality of third candidate frequency domain resources as the target frequency domain resources according to a preset resource selection rule; or
- a fourth determining unit 26243, configured to use all of the at least one fourth candidate frequency domain resource as the target frequency domain resources.

Figure 29:
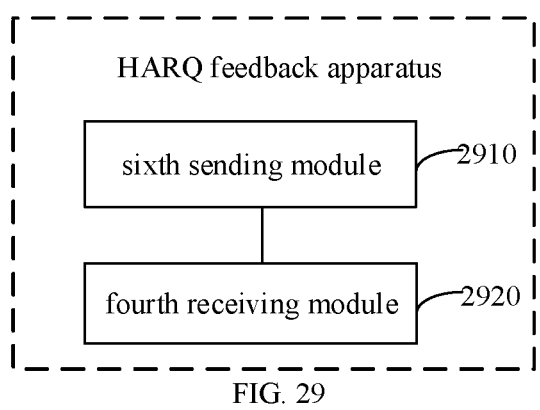
FIG. 29 is a block diagram illustrating another HARQ feedback apparatus according to an example of the present disclosure.

As shown in FIG. 29, which is block diagram illustrating another HARQ feedback apparatus according to an example, the apparatus is applied in a base station and includes:
- a sixth sending module 2910, configured to send a physical downlink shared channel (PDSCH) to a terminal;
- a fourth receiving module 2920, configured to receive an HARQ result for the PDSCH fed back by the terminal through the target frequency domain resource;

The target frequency domain resource is a frequency domain resource for carrying the HARQ result determined, after the terminal determines at least one fifth candidate frequency domain resource corresponding to the preset frequency domain resource according to the preset target correspondence, from the preset frequency domain resource and the at least one fifth frequency domain resource; where the correspondence includes correspondences between frequency domain resources corresponding to different frequency domain resources.

As shown in FIG. 29, which is block diagram illustrating another HARQ feedback apparatus according to an example, the apparatus is applied in a terminal and includes:
- a third determining module 3010, configured to, after a physical downlink shared channel (PDSCH) sent by the base station is received, determine at least one fifth candidate frequency domain resource corresponding to the preset frequency domain resource according to the preset target correspondence; the target correspondence includes correspondences between frequency domain resource identification information corresponding to different frequency domain resources;
- a fourth determining module 3020, configured to determine a target frequency resource from the preset frequency domain resource and the at least one fifth candidate frequency domain resource;
- a seventh sending module 3030, configured to, feed back an HARQ result for the PDSCH to the base station through the target frequency domain resource.

Figure 30:
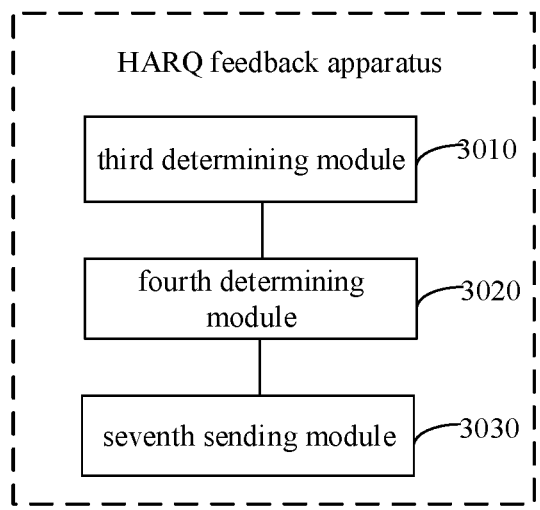
FIG. 30 is a block diagram illustrating another HARQ feedback apparatus according to an example of the present disclosure.
Figure 31:
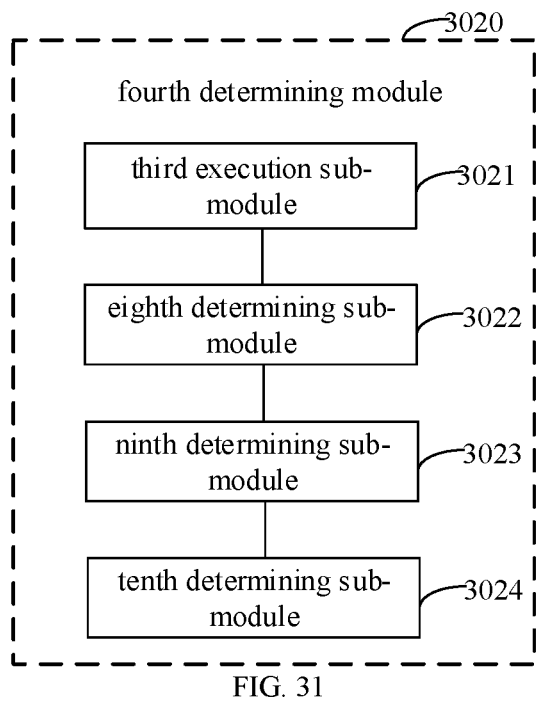
FIG. 31 is a block diagram illustrating another HARQ feedback apparatus according to an example of the present disclosure.

As shown in FIG. 31, which is block diagram illustrating another HARQ feedback apparatus based on the embodiment of FIG. 30, the fourth determining module 3020 includes:
- a third execution sub-module 3021, configured to perform listen before talk (LBT) before data being transmitted on the preset frequency domain resource;
- an eighth determining sub-module 3022, configured to, if a LBT result of the preset frequency domain resource indicates a success, use the preset frequency domain resource as the target frequency domain resource;
- a ninth determining sub-module 3023, configured to, if the LBT result of the preset frequency domain resource indicates a failure, perform LBT on all the fifth candidate frequency domain resources, and determine at least one sixth candidate frequency domain resource, wherein each of the at least one sixth candidate frequency domain resources is a fifth candidate frequency domain resources whose LBT result is successful;
- a tenth determining sub-module 3024, configured to determine the target frequency domain resource from the at least one sixth candidate frequency domain resource.

Figure 32:
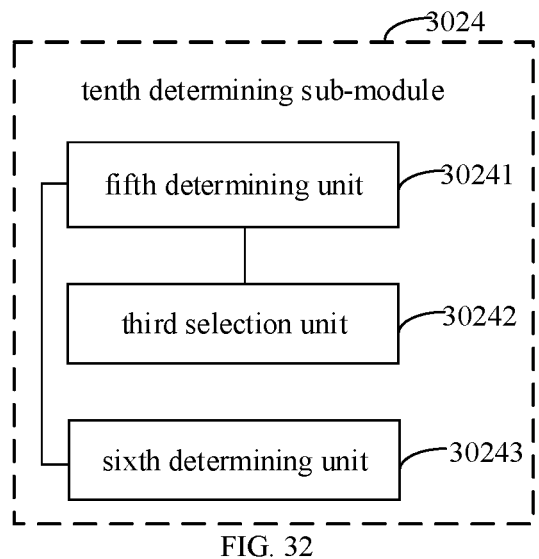
FIG. 32 is a block diagram illustrating another HARQ feedback apparatus according to an example of the present disclosure.

As shown in FIG. 32, which is block diagram illustrating another HARQ feedback apparatus based on the embodiment of FIG. 31, the tenth determining sub-module 3024 includes:

a fifth determining unit 30241, configured to, if the number of the sixth candidate frequency domain resources is one, determine the sixth candidate frequency domain resource as the target frequency domain resource;

a third selection unit 30242, configured to if the number of the sixth candidate frequency domain resources is a plurality, select one or more of the sixth candidate frequency domain resources as the target frequency domain resources according to a preset resource selection rule; or a sixth determining unit 30243, configured to use all the sixth candidate frequency domain resources as the target frequency domain resources.

For the apparatus examples, since they basically correspond to the method examples, reference may be made to the partial description of the method examples. The apparatus examples described above are merely illustrative, where the units described as separate members may be or not be physically separated, and the members displayed as units may be or not be physical units, e.g., may be located in one place, or may be distributed to a plurality of network units. Part or all of the modules may be selected according to actual requirements to implement the objectives of the solutions in the examples. Those of ordinary skill in the art can understand and implement the present disclosure without any creative effort.

Correspondingly, the present disclosure further provides a computer readable storage medium having a computer program stored thereon, where the computer program is configured to implement any of the first HARQ feedback methods at the base station side as described above.

Correspondingly, the present disclosure further provides a computer readable storage medium having a computer program stored thereon, where the computer program is configured to implement any of the first HARQ feedback methods at the terminal side as described above.

Correspondingly, the present disclosure further provides a computer readable storage medium having a computer program stored thereon, where the computer program is configured to implement any of the second HARQ feedback methods at the base station side as described above.

Correspondingly, the present disclosure further provides a computer readable storage medium having a computer program stored thereon, where the computer program is configured to implement any of the second HARQ feedback methods at the terminal side as described above.

Correspondingly, the present disclosure further provides a computer readable storage medium having a computer program stored thereon, where the computer program is configured to implement any of the third HARQ feedback methods at the base station side as described above.

Correspondingly, the present disclosure further provides a computer readable storage medium having a computer program stored thereon, where the computer program is configured to implement any of the third HARQ feedback methods at the terminal side as described above.

Correspondingly, the present disclosure also provides an HARQ feedback apparatus, which is applicable to a base station, and includes:

a processor; and a memory for storing instructions executed by the processor, wherein the processor is configured to:

configure target indication information for a terminal, where the target indication information is used to indicate frequency domain resource identification information corresponding to at least one first candidate frequency domain resources;

send the target indication information to the terminal;

after a physical downlink shared channel (PDSCH) is sent to the terminal, receiving an HARQ result for the PDSCH fed back by the terminal through the target frequency domain resource;

wherein the target frequency domain resource is a frequency domain resource for carrying the HARQ result determined by the terminal from a preset frequency domain resource and at least one first candidate frequency domain resources.

Correspondingly, the present disclosure also provides an HARQ feedback apparatus, which is applicable to a terminal, and includes:

a processor; and a memory for storing instructions executed by the processor, wherein the processor is configured to:

obtaining target indication information configured by a base station for a terminal, wherein the target indication information is used to indicate frequency domain resource identification information corresponding to at least one first candidate frequency domain resources;

after a physical downlink shared channel (PDSCH) sent by the base station is received, determine a target frequency domain resource from a preset frequency domain resource and at least one first candidate frequency domain resources;

feeding back an HARQ result for the PDSCH to the base station through the target frequency domain resource.

Correspondingly, the present disclosure also provides an HARQ feedback apparatus, which is applicable to a base station, and includes:

a processor; and a memory for storing instructions executed by the processor, wherein the processor is configured to:

configuring a target correspondence for the terminal, wherein the target correspondence comprises correspondences between frequency domain resource identification information corresponding to different frequency domain resources;

sending the target correspondence to the terminal;

after a physical downlink shared channel (PDSCH) is sent to the terminal, receiving an HARQ result for the PDSCH fed back by the terminal through the target frequency domain resource;

wherein the target frequency domain resource is a frequency domain resource for carrying the HARQ result determined from a preset frequency domain resource and at least one third candidate frequency domain resource by the terminal, after the terminal determines at least one third candidate frequency domain resource corresponding to a preset frequency domain resource based on the target correspondence.

Correspondingly, the present disclosure also provides an HARQ feedback apparatus, which is applicable to a terminal, and includes:

a processor; and a memory for storing instructions executed by the processor, wherein the processor is configured to:

receive a target correspondence configured by a base station for a terminal, where the target correspondence includes correspondences between frequency domain resource identification information corresponding to different frequency domain resources.

after a physical downlink shared channel (PDSCH) sent by the base station is received, determining at least one third candidate frequency domain resource corresponding to a preset frequency domain resource according to the target correspondence; and determining the target frequency domain resource from the preset frequency domain resource and the at least one third candidate frequency domain resource;

feeding back an HARQ result for the PDSCH to the base station through the target frequency domain resource.

Correspondingly, the present disclosure also provides an HARQ feedback apparatus, which is applicable to a base station, and includes:

a processor; and a memory for storing instructions executed by the processor, wherein the processor is configured to:

send a physical downlink shared channel (PDSCH) to a terminal;

receive an HARQ result for the PDSCH fed back by the terminal through the target frequency domain resource;

The target frequency domain resource is a frequency domain resource for carrying the HARQ result determined, after the terminal determines at least one fifth candidate frequency domain resource corresponding to the preset frequency domain resource according to the preset target correspondence, from the preset frequency domain resource and the at least one fifth frequency domain resource; where the correspondence includes correspondences between frequency domain resources corresponding to different frequency domain resources.

Correspondingly, the present disclosure also provides an HARQ feedback apparatus, which is applicable to a terminal, and includes:

a processor; and a memory for storing instructions executed by the processor, wherein the processor is configured to:

after a physical downlink shared channel (PDSCH) sent by a base station is received, determining at least one fifth candidate frequency domain resource corresponding to a preset frequency domain resource according to the preset target correspondence; wherein the preset correspondence comprises correspondences between frequency domain resource identification information corresponding to different frequency domain resources;

determining a target frequency domain resource from the preset frequency domain resource and the at least one fifth candidate frequency domain resource.

feeding back an HARQ result for the PDSCH to the base station through the target frequency domain resource.

Figure 33:
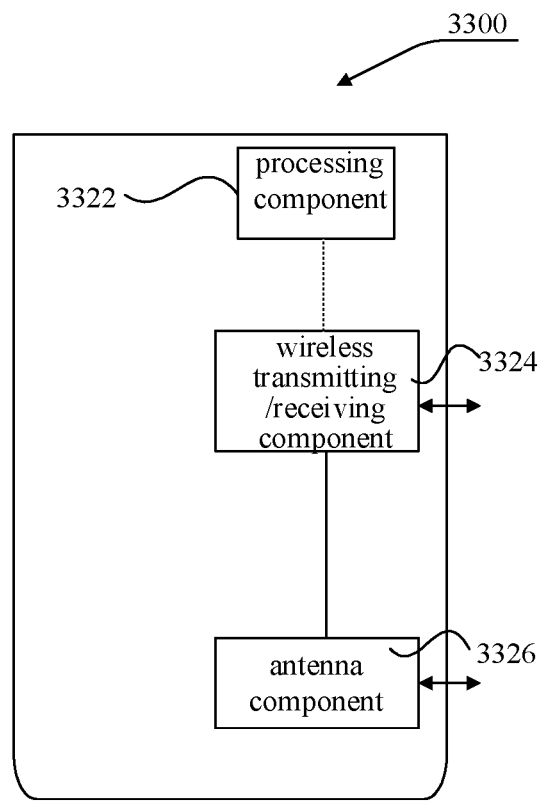
FIG. 33 is a structural schematic diagram of an HARQ feedback apparatus according to an example of the present disclosure.

As shown in FIG. 33, which is a structural schematic diagram of an HARQ feedback apparatus 3300 according to an example of the present disclosure. The apparatus 3300 may be provided a base station. Referring to FIG. 33, the apparatus 3300 includes a processing component 3322, a wireless transmitting/receiving component 3324, an antenna component 3326, and a signal processing portion specific to a wireless interface. The processing component 3322 may further include one or more processors.

One of the processors in the processing component 3322 may be configured to perform any of the HARQ feedback methods described above.

Figure 34:
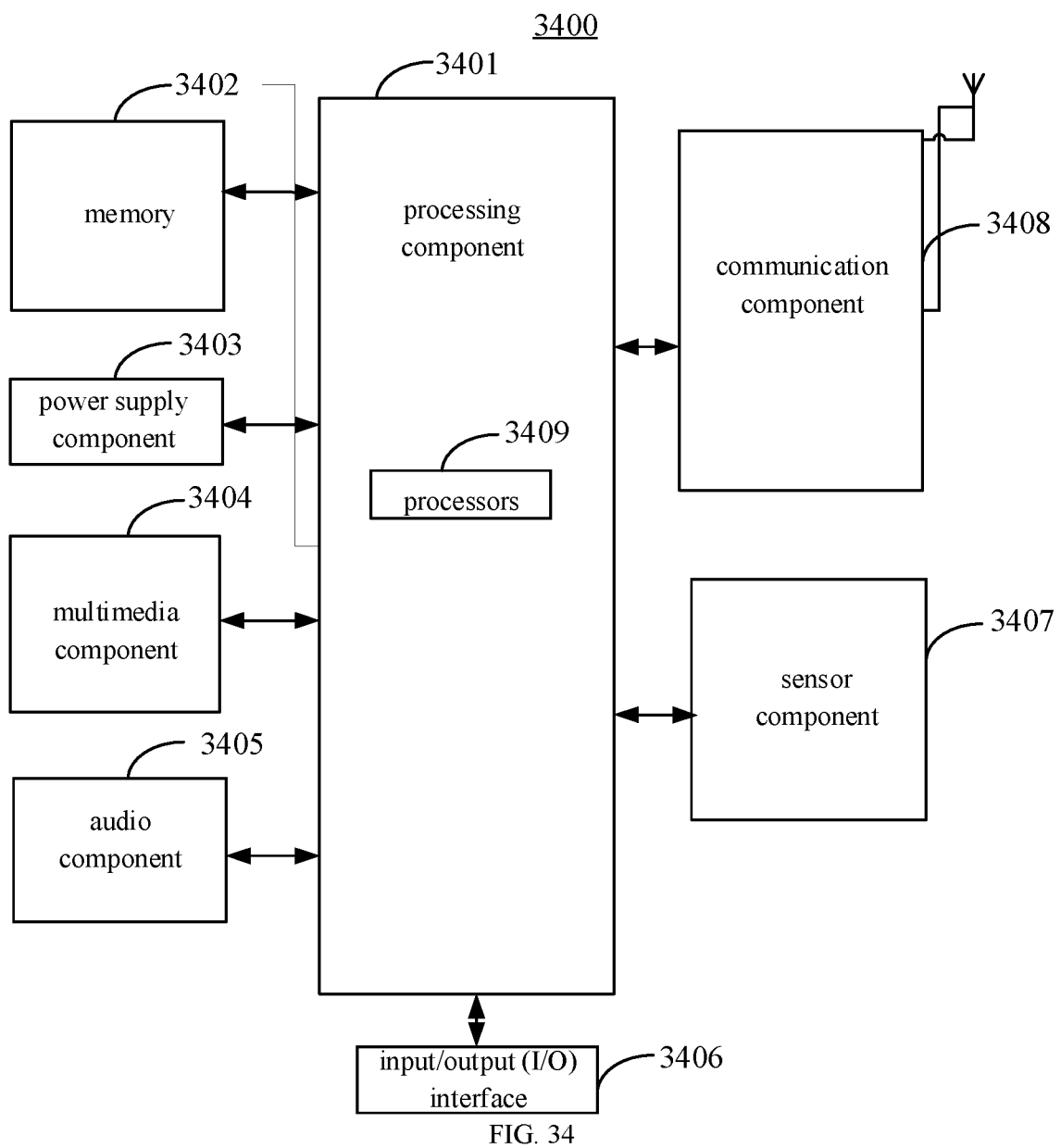
FIG. 34 is a structural schematic diagram of an HARQ feedback apparatus according to an example of the present disclosure.

FIG. 34 is a structural schematic diagram of another HARQ feedback apparatus according to an example of the present disclosure. As shown in FIG. 34, the apparatus 3400 may be a terminal such as a terminal, computer, a mobile phone, a digital broadcast terminal, a message transceiver, a game console, a tablet device, a medical device, a fitness device, a personal digital assistant, or the like.

As shown in FIG. 34, the apparatus 3400 can include one or more of the following components: a processing component 3401, a memory 3402, a power supply component 3403, a multimedia component 3404, an audio component 3405, an input/output (I/O) interface 3406, a sensor component 3407, and a communication component 3408.

The processing component 3401 usually controls the overall operation of the apparatus 3400, such as operations associated with display, telephone calls, data communications, camera operations, and recording operations. The processing component 3401 may include one or more processors 3409 to execute instructions to complete all or part of the steps of the above methods. Moreover, the processing component 3401 may include one or more modules to facilitate interaction between the processing component 3401 and other components. For example, the processing component 3401 may include a multimedia module to facilitate the interaction between the multimedia component 3404 and the processing component 3401.

The memory 3402 is to store various types of data to support the operation of the apparatus 3400. Examples of these data include instructions for any application or method operating at the apparatus 3400, contact data, phone book data, messages, pictures, videos, and the like. The memory 3402 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 3403 provides power to various components of the apparatus 3400. The power component 3403 may include a power management system, one or more power sources, and other components associated with power generated, managed, and distributed for the apparatus 3400.

The multimedia component 3404 includes a screen that provides an output interface between the apparatus 3400 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 3404 includes a front camera and/or a rear camera. The front camera and/or rear camera may receive external multimedia data when the apparatus 3400 is in an operating mode, such as a photographing mode or a video mode. Each of the front and rear cameras may be a fixed optical lens system or have a focal length and an optical zoom capability.

The audio component 3405 is configured to output and/or input audio signals. For example, the audio component 3405 includes a microphone (MIC) configured to receive an external audio signal when the apparatus 3400 is in an operation mode, such as a call mode, a recording mode, and a voice recognition mode. The received audio signal may be further stored in the memory 3402 or transmitted via the communication component 3408. In some examples, the audio component 3405 also includes a loudspeaker for outputting an audio signal.

The I/O interface 3406 provides an interface between the processing component 3401 and a peripheral interface module which may be a keyboard, a click wheel, a button, or the like. These buttons may include, but are not limited to a home button, a volume button, a start button, and a lock button.

The sensor component 3407 includes one or more sensors for providing a status assessment in various aspects to the apparatus 3400. For example, the sensor component 3407 may detect the on/off status of the apparatus 3400, and relative positioning of component, for example, the component is a display and a keypad of the apparatus 3400. The sensor component 3407 may also detect a change in position of the apparatus 3400 or a component of the apparatus 3400, a presence or absence of the contact between a user and the apparatus 3400, an orientation or an acceleration/deceleration of the apparatus 3400, and a change in temperature of the apparatus 3400. The sensor component 3407 may include a proximity sensor configured to detect the presence of nearby objects without any physical contact. The sensor component 3407 may also include a light sensor, such as a CMOS or CCD image sensor, for use in imaging applications. In some examples, the sensor component 3407 may also include an acceleration sensor, a gyro sensor, a magnetic sensor, a pressure sensor, or a temperature sensor.

The communication component 3408 is configured to facilitate wired or wireless communication between the apparatus 3400 and other devices. The apparatus 3400 may access a wireless network based on a communication standard, such as WiFi, 2G or 3G, or a combination thereof. In an example, the communication component 3408 receives a broadcast signal or broadcast related information from an external broadcast management system via a broadcast channel. In an example, the communication component 3408 may further include a Near Field Communication (NFC) module for promoting short-range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 3400 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above methods.

In an example, there is also provided a non-transitory computer-readable storage medium including instructions, such as a memory 3402 including instructions, where the instructions are executable by the processor 3409 of the apparatus 3400 to implement the method as described above. For example, the non-transitory computer-readable storage medium may be a ROM, a random access memory (RAM), a CD-ROM, a magnetic tape, a floppy disk, and an optical data storage device.

When the instructions in the storage medium are executed by the processor, the apparatus 3400 is caused to implement the HARQ feedback method according to any one of the above examples.

For the apparatus examples, since they basically correspond to the method examples, reference may be made to the partial description of the method examples. The apparatus examples described above are merely illustrative, where the units described as separate members may be or not be physically separated, and the members displayed as units may be or not be physical units, e.g., may be located in one place, or may be distributed to a plurality of network units. Part or all of the modules may be selected according to actual requirements to implement the objectives of the solutions in the examples. Those of ordinary skill in the art can understand and implement the present disclosure without any creative effort.

It is to be understood that the present disclosure is not limited to the precise structures that have described and shown in the drawings, and various modifications and changes can be made without departing from the scope thereof. The scope of the present disclosure is only limited by the appended claims.

What is claimed is:

1. A hybrid automatic repeat request (HARQ) feedback method, applied in a base station, comprising:
configuring target indication information for a terminal, wherein the target indication information indicates frequency domain resource identification information corresponding to at least one first candidate frequency domain resource;
sending the target indication information to the terminal; and
after a physical downlink shared channel (PDSCH) is sent to the terminal, receiving an HARQ result for the PDSCH fed back by the terminal through a target frequency domain resource;
wherein the target frequency domain resource comprises a frequency domain resource for carrying the HARQ result determined by the terminal from a preset frequency domain resource and the at least one first candidate frequency domain resource.

2. The method of claim 1, wherein sending the target indication information to the terminal comprises:
sending the target indication information to the terminal through scheduling signaling.

3. The method of claim 2, wherein in response to that a number of the first candidate frequency domain resources is a plurality, the target indication information comprises the plurality of pieces of indication information for indicating frequency domain resource identification information respectively corresponding to the plurality of first candidate frequency domain resources, and information contents of each piece of the indication information is carried by a preset information field in the scheduling signaling.

4. The method of claim 2, wherein in response to that a number of the first candidate frequency domain resources is a plurality, information contents of the target indication information is carried by a preset information field in the scheduling signaling.

5. The method according to claim 2, further comprising:
configuring target association information associated with the target indication information for the terminal, wherein the target association information comprises at least one of target location information or target length information, the target location information indicates starting position information about the target indication information in the scheduling signaling, and the target length information indicates a corresponding length value of the target indication information in the scheduling signaling; and
sending the target association information to the terminal through preset signaling.

6. A hybrid automatic repeat request (HARQ) feedback method, applied in a terminal, comprising:
- obtaining target indication information configured by a base station for the terminal, wherein the target indication information indicates frequency domain resource identification information corresponding to at least one first candidate frequency domain resource;
- after a physical downlink shared channel (PDSCH) sent by the base station is received, determining a target frequency domain resource from a preset frequency domain resource and the at least one first candidate frequency domain resource; and
- feeding back an HARQ result for the PDSCH to the base station through the target frequency domain resource.

7. The method of claim 6, wherein obtaining the target indication information configured by the base station for the terminal comprises:
- receiving scheduling signaling carrying the target indication information sent by the base station;
- determining target association information associated with the target indication information; wherein the target association information comprises at least one of target location information and target length information, the target location information indicates starting position information about the target indication information in the scheduling signaling, and the target length information indicates a corresponding length value of the target indication information in the scheduling signaling; and
- obtaining the target indication information in the scheduling signaling according to the target association information.

8. The method of claim 7, wherein determining the target association information associated with the target indication information comprises:
- obtaining preset target association information associated with the target indication information; or
- receiving the target association information sent by the base station through preset signaling.

9. The method of claim 6, wherein determining the target frequency domain resource from the preset frequency domain resource and the at least one first candidate frequency domain resource comprises:
- performing listen before talk (LBT) on the preset frequency domain resource;
- in response to that an LBT result for the preset frequency domain resource indicates a success, using the preset frequency domain resource as the target frequency domain resource;
- in response to that the LBT result for the preset frequency domain resource indicates a failure, performing LBT on all the first candidate frequency domain resources, and determining at least one second candidate frequency domain resource, wherein each of the at least one second candidate frequency domain resource is a first candidate frequency domain resource whose LBT result is successful; and
- determining the target frequency domain resource from the at least one second candidate frequency domain resource.

10. The method of claim 9, wherein determining the target frequency domain resource from the at least one second candidate frequency domain resource comprises:
- in response to that a number of the second candidate frequency domain resources is one, determining the one second frequency domain resource as the target frequency domain resource;
- in response to that the number of the second candidate frequency domain resources is a plurality, selecting one or more second candidate frequency domain resources from the plurality of second candidate frequency domain resources as the target frequency domain resource according to a preset resource selection rule; or
- using all of the at least one second candidate frequency domain resource as the target frequency domain resource.

11. A non-transitory computer readable storage medium storing computer programs, wherein the computer programs are used to perform the HARQ feedback method according to claim 1.

12. A non-transitory computer readable storage medium storing computer programs, wherein the computer programs are used to perform the HARQ feedback method according to claim 6.

13. A hybrid automatic repeat request (HARQ) feedback apparatus, being applicable to a base station, and comprising:
- at least one processor; and
- a memory for storing instructions executed by the at least one processor,
- wherein the at least one processor is configured to:
- configure target indication information for a terminal, wherein the target indication information is used to indicate frequency domain resource identification information corresponding to at least one first candidate frequency domain resources;
- send the target indication information to the terminal;
- after a physical downlink shared channel (PDSCH) is sent to the terminal, receive an HARQ result for the PDSCH fed back by the terminal through a target frequency domain resource;
- wherein the target frequency domain resource is a frequency domain resource for carrying the HARQ result determined by the terminal from a preset frequency domain resource and at least one first candidate frequency domain resources.

14. A HARQ feedback apparatus, being applicable to a terminal, and comprising:
- at least one processor; and
- at least one memory for storing instructions executed by the at least one processor,
- wherein the at least one processor is configured to perform the HARQ feedback method according to claim 6.

* * * * *